(12) United States Patent
McCracken

(10) Patent No.: US 9,043,742 B1
(45) Date of Patent: May 26, 2015

(54) METHODS, SYSTEMS, AND ARTICLES OF MANUFACTURE FOR IMPLEMENTING PHYSICAL DESIGN USING FORCE MODELS WITH CUSTOM CONNECTIVITY

(71) Applicant: Cadence Design Systems, Inc., San Jose, CA (US)

(72) Inventor: Thaddeus C. McCracken, Portland, OR (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/842,890

(22) Filed: Mar. 15, 2013

(51) Int. Cl.
   *G06F 17/50* (2006.01)
(52) U.S. Cl.
   CPC ........ *G06F 17/5068* (2013.01); *G06F 17/5072* (2013.01)
(58) Field of Classification Search
   USPC .......................... 716/118, 119, 123, 126, 135
   See application file for complete search history.

(56) References Cited

U.S. PATENT DOCUMENTS

| | | | |
|---|---|---|---|
| 5,682,322 A * | 10/1997 | Boyle et al. | 716/123 |
| 5,910,897 A | 6/1999 | Dangelo et al. | |
| 6,026,223 A * | 2/2000 | Scepanovic et al. | 716/122 |
| 7,469,143 B2 | 12/2008 | Jain et al. | |
| 8,046,313 B2 | 10/2011 | Hoffberg et al. | |
| 8,587,102 B2 | 11/2013 | Leedy | |
| 2003/0079192 A1 | 4/2003 | Cheong et al. | |
| 2004/0230931 A1* | 11/2004 | Barbee et al. | 716/10 |
| 2007/0147269 A1 | 6/2007 | Ettle et al. | |
| 2007/0294648 A1 | 12/2007 | Allen et al. | |
| 2008/0216040 A1 | 9/2008 | Furnish et al. | |
| 2009/0031265 A1 | 1/2009 | Papadopoulou et al. | |
| 2009/0254874 A1 | 10/2009 | Bose | |
| 2013/0283225 A1 | 10/2013 | Alpert et al. | |

OTHER PUBLICATIONS

Sang-Gil Choi and Chong-Min Kyung "A Floorplanning Algorithm Using Rectangular Voronoi Diagram and Force-Directed Block Shaping", Department of Electrical Engineering, Korea Advanced Institute of Science and Technology, 1991 IEEE.*
Meththa Samaramayake, Helen Ji, and John Ainscorgh "Force Directed Graph Drawing Algorithms for Macro Cell Placement" Proceedings of the World Congrees on Engineering 2008 vol. I.*
"Geometric Algorithms" URL: http://www.cs.princeton.edu/~rs/AlgsDS07/16Geometric.pdf, 2007.
"Voronoi Diagram" URL: http://mathworld.wolfram.com/VoronoiDiagram.html, 1999.

(Continued)

*Primary Examiner* — Brian Ngo
(74) *Attorney, Agent, or Firm* — Vista IP Law Group, LLP

(57) ABSTRACT

Disclosed are methods, systems, and articles of manufactures for implementing physical designs by using multiple force models to iteratively morph a layout decomposition. In addition to attractive force model(s) or repulsive force model(s), the physical implementation also uses a containment force model for grouping multiple design blocks or for confining a node of a cell within the boundary of a container. Another aspect is directed at deriving a first force model at the first hierarchical level from a second force model at the second hierarchical level by directly modifying the second model based at least in part on characteristic(s) of the first hierarchical level and of the second hierarchical level. In a design with multiple hierarchies, a cell-based force model is also used to ensure child nodes of a parent cell stay within a close proximity of the parent node of the parent cell.

44 Claims, 23 Drawing Sheets

(56) References Cited

OTHER PUBLICATIONS

Adya, Saurabh N., and Igor L. Markov. "Fixed-outline floorplanning: Enabling hierarchical design." Very Large Scale Integration (VLSI) Systems, IEEE Transactions on 11.6 (2003): 1120-1135.
Arya et al., "Linear-Size Approximate Voronoi Diagrams" 2002.
Arya, Sunil, Theocharis Malamatos, and David M. Mount. "Space-efficient approximate Voronoi diagrams." Proceedings of the thiry-fourth annual ACM symposium on Theory of computing. ACM, 2002.
Auber, D., et al. "Animated, Dynamic Voronoi Treemaps." 2010.
Balzer, Michael, Oliver Deussen, and Claus Lewerentz. "Voronoi treemaps for the visualization of software metrics." Proceedings of the 2005 ACM symposium on Software visualization. ACM, 2005.
Chen, Tung-Chieh, et al. "MP-trees: a packing-based macro placement algorithm for mixed-size designs." Design Automation Conference, 2007. DAC'07. 44th ACM/IEEE. IEEE, 2007.
Chen, Tung-Chieh, et al. "MP-trees: A packing-based macro placement algorithm for modern mixed-size designs." Computer-Aided Design of Integrated Circuits and Systems, IEEE Transactions on 27.9 (2008): 1621-1634.
Choi, S-G., and Chong-Min Kyung. "A floorplanning algorithm using rectangular Voronoi diagram and force-directed block shaping." Computer-Aided Design, 1991. ICCAD-91. Digest of Technical Papers., 1991 IEEE International Conference on. IEEE, 1991.
David Austin, "Voronoi Diagrams and a Day at the Beach", URL: http://www.ams.org/samplings/feature-column/fcarc-voronoi, Aug. 2006.
Non-Final Office Action dated Mar. 17, 2014 for U.S. Appl. No. 13/842,684.
Non-Final Office Action dated Apr. 22, 2014 for U.S. Appl. No. 13/842,791.
Final Office Action dated Apr. 22, 2014 for U.S. Appl. No. 13/843,706.

Fatemeh Ahmadi Nejad Masouleh, "Constructing Weighted Voronoi Diagrams Using Computer Programs", URL: http://giswin.geo.tsukuba.ac.jp/sis/tutorial/GISHint,fatemeh.pdf, Dec. 2006.
Fruchterman, Thomas MJ, and Edward M. Reingold. "Graph drawing by force-directed placement." Software: Practice and experience 21.11 (1991): 1129-1164.
Guilherme Fonseca, "Approximate Voronoi Diagrams" Mar. 2005.
Guo, Pei-Ning, Chung-Kuan Cheng, and Takeshi Yoshimura. "An O-tree representation of non-slicing floorplan and its applications." Proceedings of the 36th annual ACM/IEEE Design Automation Conference. ACM, 1999.
Hu, Yifan. "Efficient, high-quality force-directed graph drawing." Mathematica Journal 10.1 (2005): 37-71.
Ogniewicz, R., and M. Ilg. "Voronoi skeletons: Theory and applications." Computer Vision and Pattern Recognition, 1992. Proceedings CVPR'92., 1992 IEEE Computer Society Conference on. IEEE, 1992.
Schneider, Jens, Martin Kraus, and Rüdiger Westermann. "GPU-based Real-time Discrete Euclidean Distance Transforms with Precise Error Bounds." VISAPP (1). 2009.
Sud, Avneesh, Danyel Fisher, and Huai-Ping Lee. "Fast dynamic voronoi treemaps." Voronoi Diagrams in Science and Engineering (ISVD), 2010 International Symposium on. IEEE, 2010.
T. Ventimiglia et al., "The Barnes-Hut Algorithm" URL: arborjs.org/docs/barnes-hut, 2003.
Vorwerk, Kristofer, Andrew Kennings, and Anthony Vannelli. "Engineering details of a stable force-directed placer." *Proceedings of the 2004 IEEE/ACM International conference on Computer-aided design*. IEEE Computer Society, 2004.
Final Office Action dated Aug. 28, 2014 for U.S. Appl. No. 13/842,684.
Non-Final Office Action dated Sep. 29, 2014 for U.S. Appl. No. 13/842,791.
Notice of Allowance dated Aug. 13, 2014 for U.S. Appl. No. 13/843,706.
Notice of Allowance dated Jan. 22, 2015 for U.S. Appl. No. 13/842,684.

\* cited by examiner

METHODS, SYSTEMS, AND ARTICLES OF MANUFACTURE FOR IMPLEMENTING PHYSICAL DESIGN USING FORCE MODELS WITH CUSTOM CONNECTIVITY

CROSS REFERENCE TO RELATED APPLICATION(S)

This application is related to U.S. patent application Ser. No. 13/843,706 entitled "METHODS, SYSTEMS, AND ARTICLES OF MANUFACTURE FOR IMPLEMENTING PHYSICAL DESIGN DECOMPOSITION WITH CUSTOM CONNECTIVITY", and U.S. patent application Ser. No. 13/842,684 entitled "METHODS, SYSTEMS, AND ARTICLES OF MANUFACTURE FOR IMPLEMENTING PHYSICAL DESIGNS WITH FORCE DIRECTED PLACEMENT OR FLOOR PLANNING AND LAYOUT DECOMPOSITION WITH CUSTOM CONNECTIVITY", and U.S. patent application Ser. No. 13/842,791 entitled "METHODS, SYSTEMS, AND ARTICLES OF MANUFACTURE FOR PROVIDING INTERACTIVE, CONTINUOUS FEEDBACK IN IMPLEMENTING PHYSICAL DESIGNS USING FORCE DIRECTED PLACEMENT OR FLOOR PLANNING AND LAYOUT DECOMPOSITION WITH CUSTOM CONNECTIVITY", the content of the three applications is hereby incorporated by reference in its entirety for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A modern IC design, an IP (intellectual property) cell in the IC (integrated circuit) core area may communicate and exchange data with certain. IP cells in the IC core area via certain part(s) in the outer I/O (input/output) ring and thus need to stay within some close proximity of the corresponding portion in the I/O ring. During the early design planning stages where design data are scarce and incomplete at best, an architect may have to determine what the fabric need to look like in order to meet various criteria, such as functional requirements, I/O conductivity or connectivity, fabric configuration, etc.

Moreover, some of the design criteria may compete with some other design criteria, and the conflicting criteria may further exacerbate the challenges. Traditional approaches typically receive, for example, the functional requirements for a design, model the design in terms of the flow of the signals and the logic operations on these signals in RTL (register transfer level), synthesize the RTL, and perform prototyping using the netlist from the synthesis. Nonetheless, such conventional approaches may not property serve prototyping, IO planning, feasibility analysis, or floorplanning in early design stages where the details of the design are lacking or to be determined. Therefore, what is needed is a method, system, and computer program product for implementing physical design decomposition with custom connectivity.

SUMMARY

Disclosed are various embodiments of methods, systems, and articles of manufactures for implementing physical designs using force models. Various embodiments implement a physical design by using multiple force models, which include one or more attractive force models, one or more repulsive models, or combinations thereof, to iteratively morph a layout decomposition that includes a plurality of cells by using the force models to move at least some nodes of the plurality of cells and then to re-partition the design based at least in part on these nodes that have been moved to new locations by the force models. In addition to attractive force model(s) or repulsive force model(s), some embodiments also use a containment force model for grouping multiple design blocks or cells or for confining a node of a cell within the boundary of a container.

Some embodiments are directed at deriving a second force model at the second hierarchical level from a first force model at the first hierarchical level by directly modifying the second model based at least in part on one or more characteristics of the first hierarchical level and the corresponding one or more characteristics of the second hierarchical level. In a design with multiple hierarchies, some embodiments may use a cell-based force model to ensure that the child nodes of a parent cell stay close to the parent node of the parent cell.

Some embodiments use the force models to operate on a set of cells representing decomposition of a layout area so as to determine a placement layout or a floorplan while maintaining custom, incomplete conductivity information. Various embodiments described herein use force models and decomposition engine(s) and do not require that complete conductivity information be provided in order to generate a placement layout or floorplan, which resembles a final placement layout or a final floorplan, for quick feasibility studies or quick prototyping, without using conventional placement tool or floorplanner.

Some embodiments employ the use of a force model, which models the interaction between two features in a design by using both the attraction and repulsion forces. The force model enables the designer or the architect to observer the results of floorplanning or IO (input/output) planning in early stages of the electronic design while maintaining specific connectivity requirement(s). A typical example of a specific connectivity requirement is a user specified connectivity between a circuit feature (e.g., a cell) in the IC core area and another circuit feature (e.g., a pin or an IO cell) in the ring area of the IC design.

The force model may incrementally calculate the attractive forces and/or repulsive forces for each circuit feature (e.g., a cell or a node) that are interconnected with another circuit feature, determines the resultant force for the circuit feature, and then moves the circuit feature according to the resultant force. The force model then iteratively recalculates the resultant force for each circuit feature until a convergence criterion is met. An example of such a convergence criterion is when the variation of some energy (e.g., potential energy) of the electronic design is smaller than or equal to a predetermined threshold value.

The force model may constrain the move of each circuit feature by using a container that limits the range in which the circuit feature may be moved in some embodiments. The boundary of a core cell, a pin, an IO cell, or any elements of a physical hierarchy may serve as a container for the cell or the pin under consideration for the determination of the attractive and repulsive forces for the cell or pin.

In some embodiments, the repulsive force may be modeled as electrical repulsive force between the two circuit features, both of which may be modeled as electrical charges of the same polarity. In some embodiments, the repulsion may be modeled as the restoring force of a spring connecting both circuit features. In some embodiments, the attractive force may be modeled as a spring force model having a spring connected between two circuit features or gravitational pull between these two circuit features whose "weights" are proportional to their respective areas. The force model may work with any decomposition or partitioning schemes and may model various forms of requirements or constraints in terms of attractive and/or repulsive forces such that all the required or desired requirements, including conflicting requirements, may be accommodated during the early stages of the electronic design.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE FIGURES

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of the inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF ILLUSTRATED EMBODIMENTS

Various embodiments are directed to a method, system, and computer program product for implementing and using virtual sales process engineering. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of various embodiments, unless otherwise specifically described in particular embodiment(s) or recited in the claim(s). Where certain elements of embodiments may be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration. More details about various processes or modules to implement various embodiments are further described below with reference to FIGS. 1-16.

Figure 1:
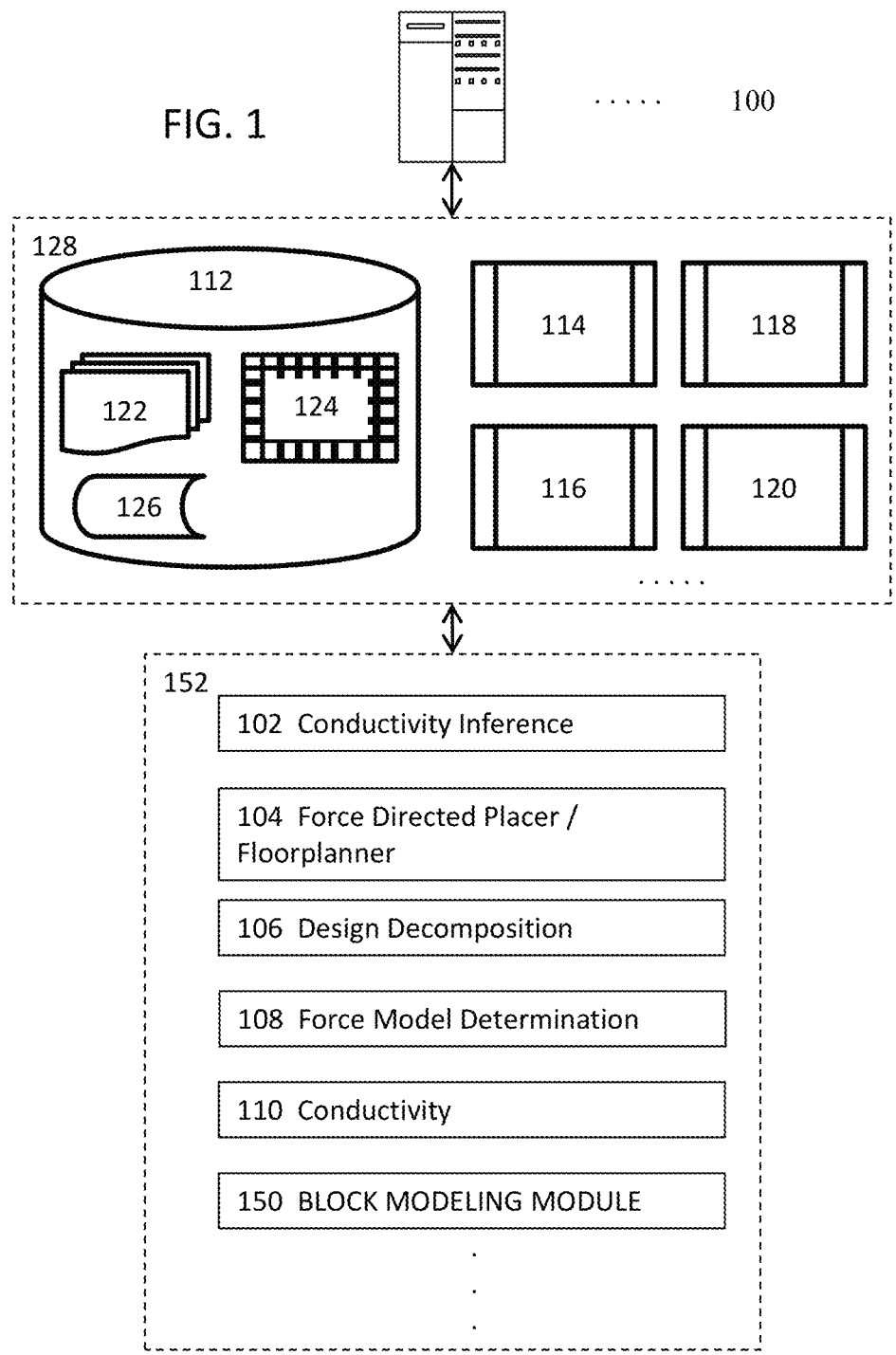
FIG. 1 illustrates a schematic representation of exemplary implementations for implementing physical design decomposition with custom connectivity in some embodiments.

FIG. 1 illustrates a high level block diagram for implementing physical design decomposition with custom connectivity in some embodiments. In one or more embodiments, the system for implementing physical design decomposition with custom connectivity may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access various resources 128 that may comprise a global routing engine and/or a detail routing engine 114, a layout editor 116, a design rule checker 118, a verification engine 120, etc. The one or more computing systems 100 may further write to and read from a local or remote volatile or non-volatile computer accessible storage 112 that stores thereupon data or information such as, but not limited to, one or more databases (124) such as schematic design database(s) or physical design database(s), libraries, data, rule decks, constraints, etc. (122), or other information or data (126) that may be used to facilitate the performance of various functions to achieve the intended purposes.

In some embodiments, the one or more computing systems 100 may, either directly or indirectly through various resources 128, invoke various software, hardware modules, or a combination thereof 152 that may comprise a conductivity or connectivity (hereinafter conductivity) inference module 102 to infer conductivity for a physical design or a portion thereof, a force directed placement or floorplanning module 104 to perform the placement or floorplanning functions for the physical design or a portion thereof, a design decomposition or partitioning module 106 to partition an area of a physical design into a plurality of cells, regions, or blocks (hereinafter cells) either alone or jointly with one or more other modules, a force model determination modules 108 to determine various characteristics, parameters, variables, etc. for one or more force models, or a conductivity reconfiguration engine 110 to reconfigure some conductivity for a physical design or a portion thereof, etc.

Figure 2:
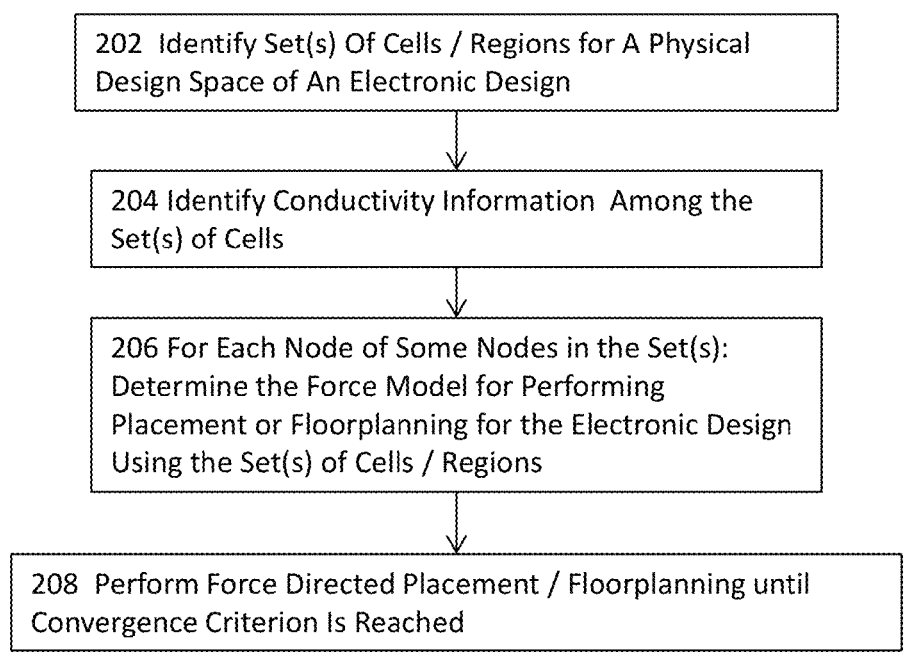
FIG. 2 illustrates a top level flow diagram for implementing physical designs using force models in some embodiments.

FIG. 2 illustrates a top level flow diagram for implementing physical designs using one or more force models in some embodiments. In one or more embodiments, the method for implementing physical designs using force models may comprise the process 202 of identifying one or more sets of cells or regions (hereinafter cells) for an area in the physical design space of a design. In some embodiments where the area of interest includes only one hierarchical level or a portion of a single hierarchical level, process 202 identifies one set of cells that represents the decomposition of the area of interest. In some embodiments where the area of interest includes multiple hierarchical levels, process 202 may identify multiple sets of cells, each of which representing the decomposition of the corresponding hierarchical level. In some embodiments, the method may comprise the process 204 of identifying conductivity or connectivity information (hereinafter conductivity information) among the one or more sets of cells.

In some embodiments, the conductivity information comprises custom conductivity information such as but not limited to user specified conductivity for the design. In some embodiments, the conductivity information contains only partial, incomplete conductivity for the entire design. In some embodiments, the conductivity information does not necessarily dictate how a first design block (e.g., an intellectual property or IP block or generally any group of electronic design components of an electronic design) is precisely connected to other blocks. Rather, the conductivity information may merely indicate that the first design block communicates with (e.g., exchanging data) or and is thus somehow connected to these other blocks. That is, the conductivity information does not necessarily specify, for example, which port of one design block is to be connected to another port of another design block but simply indicates that a design block communicates to another design block. It shall be noted that the terms conductivity and connectivity are used interchangeably, unless otherwise specifically recited.

For example, the conductivity information for an electronic design may simply indicate or require that the design block representing the CPU is to be connected to another design block representing the IO (input/output) bus without specifying, for example, which pins, terminals, or pads in the CPU are to be connected to the pins, terminals, or pads of the IO bus. In some of the one or more embodiments, the custom conductivity contains only incomplete conductivity without providing complete conductivity information for the entire design. As another example, the custom conductivity may contain only the conductivity information that specifies a first cell to be connected to a first IO cell, a second cell to be connected to a second IO cell, and a third cell to be connected to a fourth cell, while leaving all the remaining cells in the design unspecified in these embodiments. In other words, various processes and modules described herein do not require or assume the conductivity information provided to these various processes or modules is complete and can operate on the design to achieve their respective intended purposes with only the incomplete conductivity.

In some embodiments, the method may comprise the process 206 of determining one or more force models for performing force directed placement or floorplanning for the electronic design using at least the one or more sets of cells. In some embodiments, the method may optionally comprise the process of anchoring a first cell in the one or more sets of cells by using a containment or container for the first cell. It shall be noted that unless otherwise specifically specified, the term containment and the term container are used interchangeably throughout the application. In some embodiments, the method may comprise the process 208 of performing force directed placement or floorplanning to generate a placement layout or a floorplan until one or more convergence or stopping criteria are satisfied while maintaining the conductivity information in the placement layout or the floorplan. In some embodiments, the one or more convergence or stopping criteria include, for example but not limited to, achieving a minimal or sufficient low energy state, whether each cell in the first set of cells is sufficiently close to one or more target cell sizes, whether the standard deviation of the sizes of the cells from one or more target cell sizes in the first set is below some prescribed threshold level, whether the wire lengths are within some threshold number, or whether the first hierarchical level of the design based on the first set of cells meets some timing requirements, etc.

Figure 3:
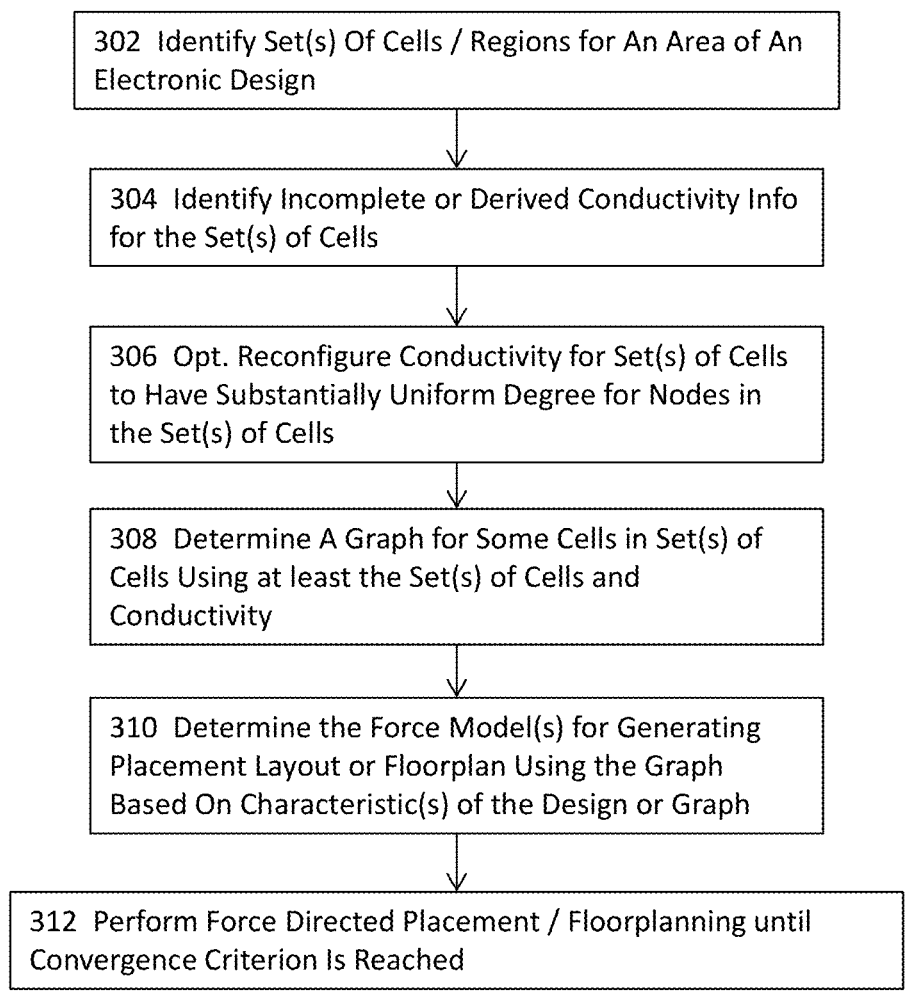
FIG. 3 illustrates more details about a top level flow diagram for implementing physical designs using force models in some embodiments.

FIG. 3 illustrates more details about a top level flow diagram for implementing physical designs using one or more force models in some embodiments. In one or more embodiments, the method for implementing physical designs using one or more force models illustrated in FIG. 3 may comprise the process 302 of identifying one or more sets of cells for an area of interest in an electronic design in a substantially similar manner as that described for 202. In some embodiments, the method may comprise the process 304 of identifying conductivity information for the one or more sets of cells. In some embodiments, the conductivity information identified at 304 comprises custom conductivity information or partial, incomplete conductivity information as that described for 204.

In some embodiments, the conductivity information may comprise derived or inferred conductivity information that is derived by using at least the one or more sets of cells identified at 302. More details about deriving or inferring conductivity information using at least one or more sets of cells representing decomposition of an electronic design are described in U.S. patent application Ser. No. 13/843,706 entitled "METHODS, SYSTEMS, AND ARTICLES OF MANUFACTURE FOR IMPLEMENTING PHYSICAL DESIGN DECOMPOSITION WITH CUSTOM CONNECTIVITY", the content of which is hereby incorporated by reference in its entirety for all purposes.

In some embodiments, the method may optionally comprise the process 306 of configuring or reconfiguring the conductivity information for at least some cells in the one or more sets of cells to have substantially uniform degree for nodes in the one or more sets of cells. In the graph theory, the degree or valency of a vertex of a graph denotes the number of edges incident to the vertex with loops counted twice. The degree of a vertex of the graph layout constructed by, for example, process 308 also represents the number of neighboring cells of a cell, if the conductivity information has not been configured or reconfigured as described in process 306. More details about configuring or reconfiguring the conductivity information are described in U.S. patent application Ser. No. 13/843,706 entitled "METHODS, SYSTEMS, AND ARTICLES OF MANUFACTURE FOR IMPLEMENTING PHYSICAL DESIGN DECOMPOSITION WITH CUSTOM CONNECTIVITY", the content of which is hereby incorporated by reference in its entirety for all purposes.

In some embodiments, the method may comprise the process 308 of determining a graph for some cells in the one or more sets of cells using at least the one or more sets of cells and the conductivity information. In some embodiments, each cell of the some cells is represented as a vertex in the graph, and an edge between two vertices in the graph indicates that the two vertices are not only adjacent to but also interacting with each other in some embodiments. In some embodiments, the method may comprise the process 310 of determine the force model(s) for generating placement layout or floorplan using the graph based at least in part on one or more characteristics of the design or of the graph.

For example, the method may determine to use one or more attractive force models, one or more repulsive force models, a containment force model, and a cell-based force model for a user-defined, physical electronic design (e.g., the edges or nodes in a graph layout comprise user-defined elements) in some embodiments. The method may also determine to use one or more attractive force models (e.g., Voronoi attractive force model or cell attractive force model) and a containment force model for a physical electronic design that is derived by using the Voronoi-based graph layout to drive a Voronoi diagram to the target area convergence or stopping criterion in some embodiments.

The method may also determine to use one or more attractive force models (e.g., Voronoi attractive force model or cell attractive force model), one or more repulsive force models, and a containment force model for a physical electronic design that is derived by using the Voronoi-based graph layout to drive a Voronoi diagram to the target area convergence or stopping criterion in some embodiments. More details about the decomposition process are described in U.S. patent application Ser. No. 13/843,706 entitled "METHODS, SYSTEMS, AND ARTICLES OF MANUFACTURE FOR IMPLEMENTING PHYSICAL DESIGN DECOMPOSITION WITH CUSTOM CONNECTIVITY", the content of which is hereby incorporated by reference in its entirety for all purposes. In some embodiments, the method may comprise the process 312 of performing force directed placement or floorplanning to generate a placement layout or a floorplan while maintaining the conductivity information initially identified at 304 until one or more convergence or stopping criterion are satisfied.

Figure 4:
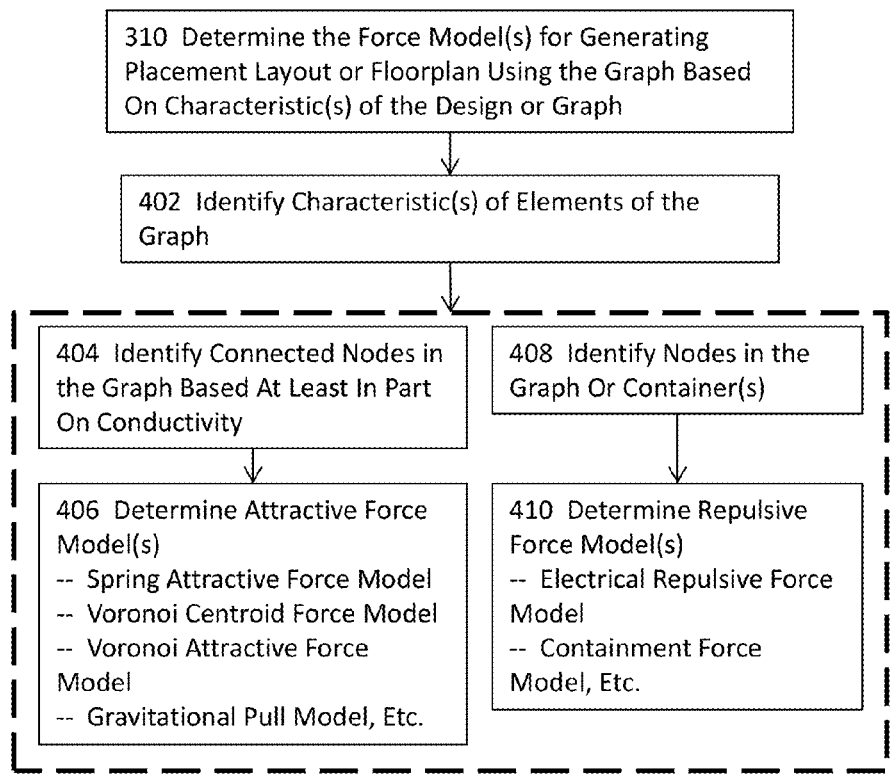
FIG. 4 illustrates more details about the top level flow diagram illustrated in FIG. 3 in some embodiments.

FIG. 4 illustrates more details about the top level flow diagram illustrated in FIG. 3 in some embodiments. More specifically, FIG. 4 illustrates more details about process 310 of FIG. 3. In some embodiments, process 310 may comprise the process 402 of identifying one or more characteristics of the elements of the graph. For example, process 402 may identify how an area of interest in the physical design space of an electronic design is partitioned or what kind of decomposition algorithms are used to decompose the area of interest. In some embodiments, process 310 may comprise the process 404 of identifying connected nodes in the graph based at least in part on the conductivity information.

In some embodiments where Voronoi decomposition is used to partition a design, all nodes of neighboring Voronoi cells may be potentially connected. Nonetheless, the method may present an option to the user to remove specific connectivity between two nodes in order to achieve a substantially uniform degree for the graph consisting of the vertices (representing the Voronoi cells) and edges (representing the connectivity). Therefore, the method may optionally identify the connected nodes at 404 in some embodiments. In some embodiments, process 310 may comprise the process 406 of determining one or more attractive force models.

The one or more attractive force models may include, for example but not limited to, a spring attractive force model, a cell-based force model (e.g., a Voronoi centroid force model), a Voronoi attractive force model, a gravitational pull force model, or combinations thereof, etc. More details about the force models will be described in subsequent paragraphs with reference to appropriate drawing figures. In some embodiments, process 310 may comprise the process 408 of identifying nodes in the graph for modeling the one or more repulsive force models. In some embodiments, process 310 may comprise the process 410 of determining one or more repulsive force models. The one or more repulsive force models may include, for example but not limited to, an electrical repulsive force model, a containment force model, or combinations thereof, etc.

Figure 5:
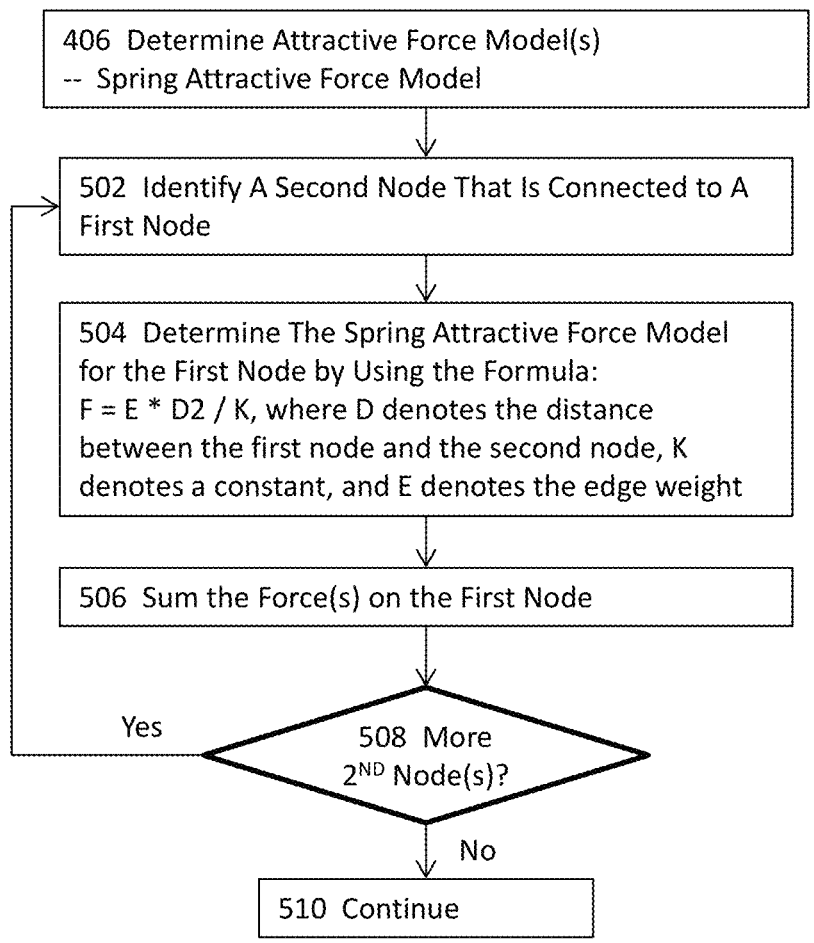
FIG. 5 illustrates more details about the top level flow diagram illustrated in FIG. 4 in some embodiments.

FIG. 5 illustrates more details about the top level flow diagram illustrated in FIG. 4 in some embodiments. More specifically, FIG. 4 illustrates the process for determining a spring attractive force model. In some embodiments, the process of determining the spring force model for a first node includes the process 502 of identifying a second node that is connected to a first node from a graph such as the graph generated by process 308. In some embodiments, the process 406 may further comprise the process 504 of determining the spring attractive force model for the first node by using the formula: $F=E*D2/K$, where F denotes the attractive force on the first node, D denotes the distance between the first node and the second node, K denotes a constant, and E denotes the edge weight.

The edge weight comprises a factor such that certain edges connecting two nodes may be weighted to exert more attractive force than other nodes in some embodiments. The constant K may be adjusted for each design. More details about the constant K will be provided in subsequent paragraphs. In some embodiments, the process 406 may further comprise the process 506 of summing the force(s) on the first node by using vector mathematics. In some embodiments, the process 406 may further comprise the process 508 of determining whether there are more second nodes that are connected to the first node in the graph. If process 508 determines that there are more second nodes connected to the first node, process 406 may return to 502 to identify the next second node and repeats the processes 502-508 until all the second nodes that are connected to the first node have been processed.

In some embodiments, the process 406 may further comprise the process 510 of saving the force model for the first node and continue with, for example, performing the same for the next first node. In these embodiments illustrated by FIG. 5, connected nodes (or vertices) in the graph constructed by, for example, process 308 attract each other in the spring attractive force model, whereas the spring attractive force model does not apply to non-connected nodes. As a result, a change in the conductivity may alter how some nodes are connected to other nodes and thus change the spring attractive force model.

Figure 6:
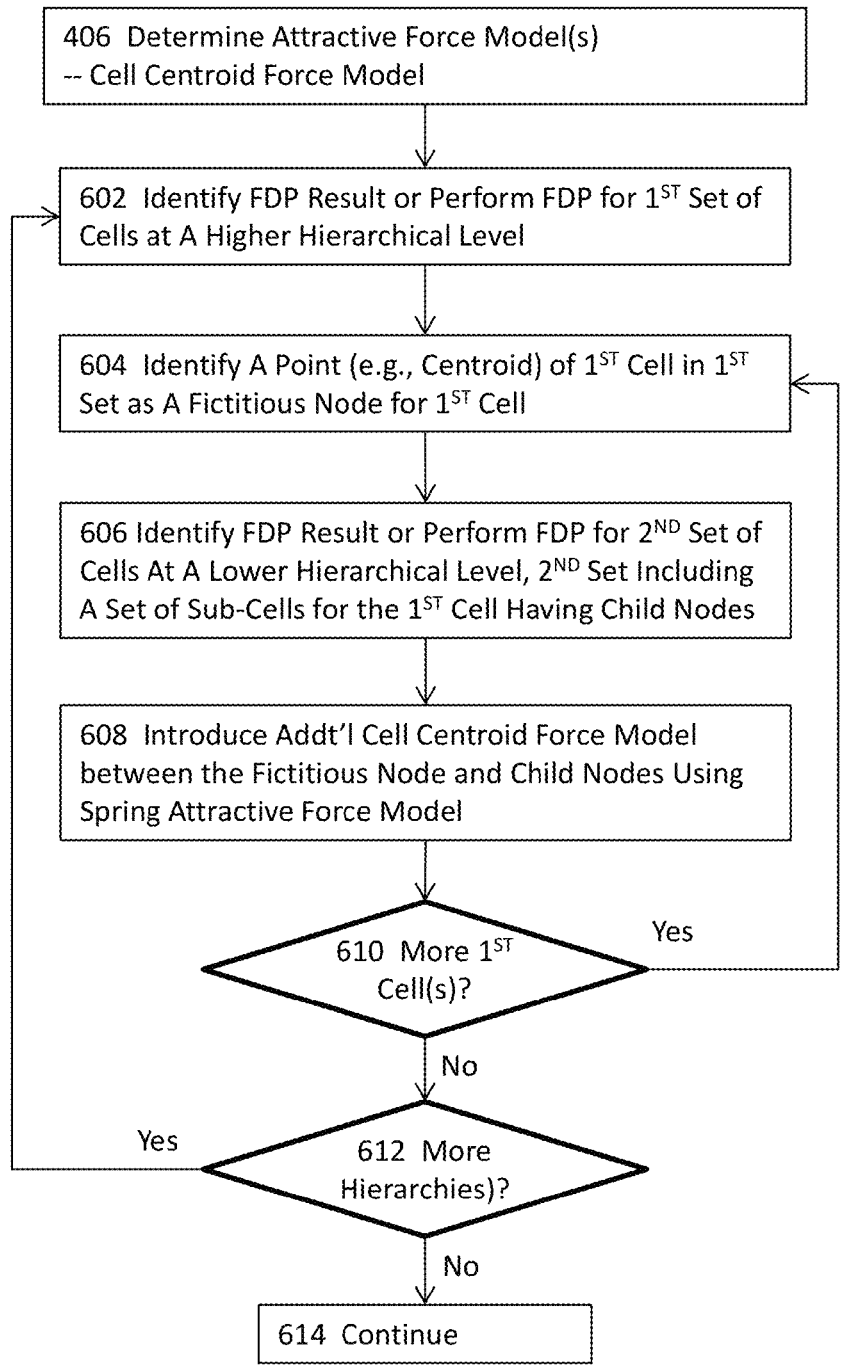
FIG. 6 illustrates more details about the top level flow diagram illustrated in FIG. 4 in some embodiments.

FIG. 6 illustrates more details about the top level flow diagram illustrated in FIG. 4 in some embodiments. More specifically, FIG. 6 illustrates the process of determining the cell-based force model such in some embodiments. In some embodiments, the centroids of cells are utilized in determining the cell-based force model, and such a cell-based force model may thus be called a cell centroid force model. In some embodiments, the process 406 may comprise the process 602 of performing the force directed placement or floorplanning (hereinafter FDP) or identifying the FDP results for the first set of cells at a higher hierarchical level.

In some embodiments, the process 406 may comprise the process 604 of identifying a point (e.g., the centroid of a cell) of a first cell in the first set of cells as a cell-based force or a fictitious node for the first cell. It shall be noted that the cell-based force node is fictitious in nature because in a graph layout, a node (or vertex) represents a cell, yet the cell-based force nodes do not correspond to any cells representing the physical design. It shall be further noted that some embodiments use the centroids of cells as the fictitious nodes in determining the cell-based force model, but the centroids are not the only points that may be used for determining the cell-based force model and thus shall not be considered as limiting the scope of various other embodiments described herein or the scope of the claims, unless otherwise specifically recited in the claims.

For example, in some embodiments where the Voronoi decomposition process is used to partition a physical design area into a plurality of cells, the Voronoi cell generating nodes may also be used as the fictitious nodes for determining the cell-based attractive force model. In the embodiments illustrated in FIG. 7, the cell-based attractive force model follows a similar form of the spring or electrical force model but may be further weighted by a weighting factor to balance the influence the influence of the cell-based force vectors on one or more other more forces.

In some embodiments, the process 406 may comprise the process 606 of performing the force-directed placement or floorplanning or identifying the FDP results for a second set of cells at a lower hierarchical level. In some embodiments, the second set of cells includes a set of sub-cells for the first cell and an equal number of child nodes as the total number of sub-cells in the first cell.

In some embodiments, the process 406 may comprise the process 608 of introducing additional cell centroid force model between the cell-based force node of the first cell and child nodes using the spring attractive force model. In these embodiments, the process 406 introduces additional forces between the child nodes in a cell and a designated cell-based force node (e.g., the Voronoi cell generation node of a cell) of the node. The method may use the attractive forces introduced by the cell-based force model to keep the nodes of the sub-cells close to where the original node (e.g., the Voronoi generation node) of the parent cell is located at the higher hierarchical level. In these embodiments, various methods described herein may use the cell-based force model to preserve the global layout that has been implemented at earlier steps.

In some embodiments, the process 406 may comprise the process 610 of determining whether there are more first cells to be processed. If process 610 determines that there are more first cells to be processed, process 406 may return to 604 and repeat the processes 604~610 until all the first cells of interest have been processed. Otherwise, the process 406 may further proceed to 612 to determine whether there are more hierarchies in the electronic design. If process 612 determines that there are more hierarchies situated below the hierarchical level processed at 606, process 406 may return to 602 and repeat processes 602~610 until all the hierarchies of interest have been processed. Otherwise, process 406 may proceed to 614 to proceed with, for example, the FDP process or determine one or more other force models. Various embodiments illustrated in FIG. 6 may be used for a graph that has been constructed to have multiple levels to avoid issues that are common to other force-directed placement or floorplanning algorithms that often arrive at a local minimum that is clearly and obviously not optimal.

Figure 7:
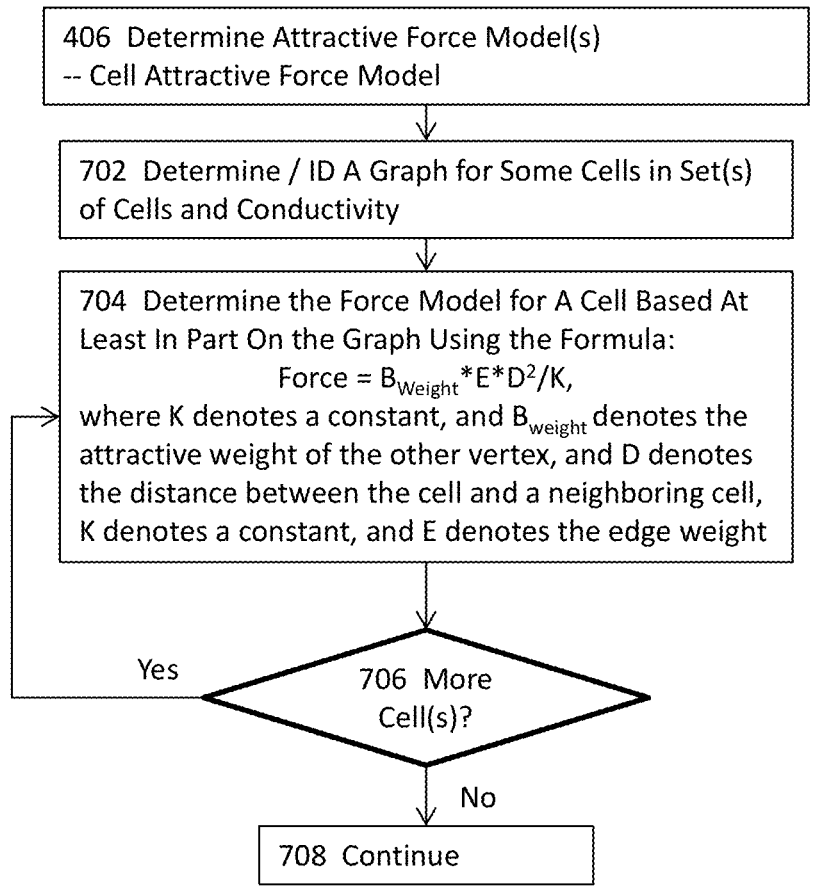
FIG. 7 illustrates more details about the top level flow diagram illustrated in FIG. 4 in some embodiments.

FIG. 7 illustrates more details about the top level flow diagram illustrated in FIG. 4 in some embodiments. More specifically, FIG. 7 illustrates a high level flow diagram for determining the cell attractive force model. In some embodiments where Voronoi decomposition is used to form a plurality of Voronoi cells, the cell attractive force model may also be called a Voronoi attractive force model. In some embodiments, the process 406 may comprise the process 702 of determining or identifying a graph (e.g., a graph determined by process 308 of FIG. 3) for some cells in the one or more sets of cells identified at 302 based at least in part upon the conductivity information. In some embodiments, the some cells include the cells in a core area of a chip design and the cells that are not in the core area (e.g., the IO cells in an IO ring of the chip design) but are connected to the cells in the core area. In some embodiments, the process 406 may comprise the process 704 of determining the force model for a cell based at least in part on the graph using the formula:

Force=$B_{weight}*E*D^2/K$, where $B_{weight}$ denotes the attractive weight of the other vertex or node, E denotes the edge weight, and D denotes the distance between the cell and a neighboring cell, and K denotes a constant. In some embodiments, various methods use the $B_{weight}$ to control the layout of the graph based at least in part on the goal of achieving, for example, a target area for each cell. More details about D, K, and $B_{weight}$ will be described in subsequent paragraphs. In some embodiments, the process 406 may comprise the process 706 of determining whether there are more cells to be processed. In some embodiments where process 706 determines that there is an additional cell to be processed, process 406 may return to 704 to determine the cell attractive force model for this additional cell and repeats processes 704~706 until all the cells of interest have been processed. Otherwise, process 406 may proceed to 708 to continue with, for example, determining one or more other force models or performing the FDP process for the design.

Figure 8:
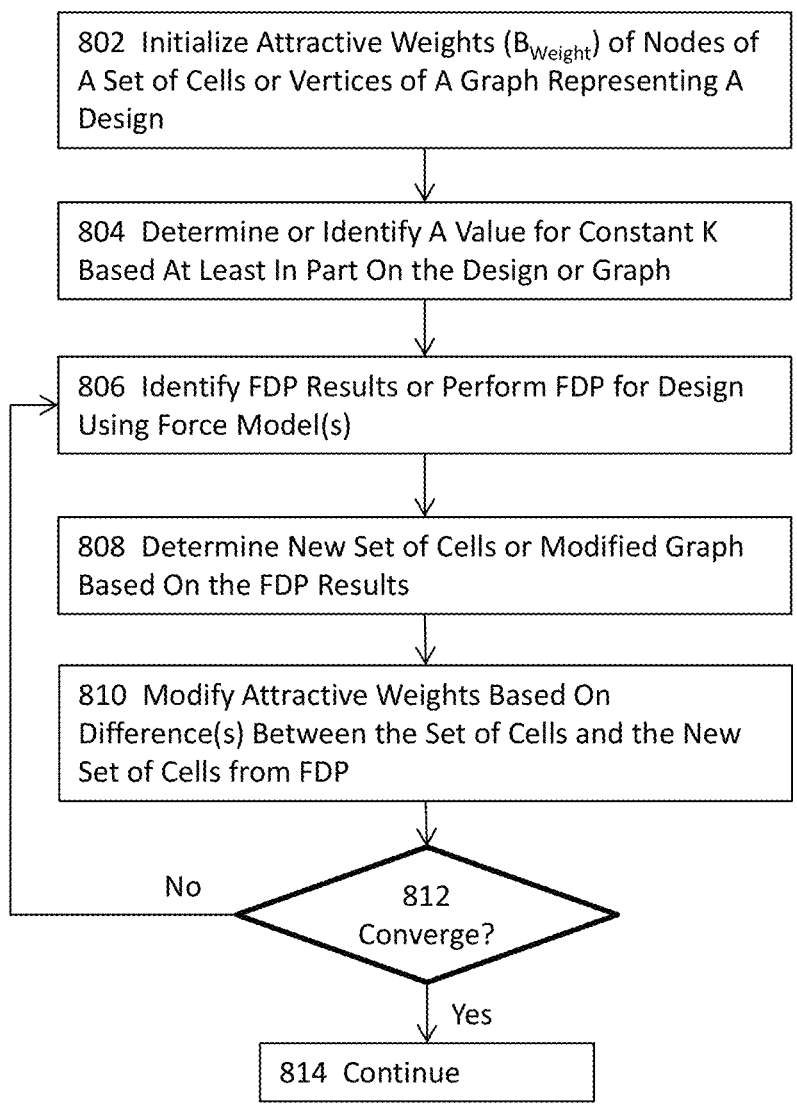
FIG. 8 illustrates a top level flow diagram for implementing physical designs using force models in some embodiments.

FIG. 8 illustrates a top level flow diagram for implementing physical designs using one or more force models in some embodiments. More specifically, FIG. 8 illustrates an exemplary top level flow diagram of a method for determining the attractive weights (E or $B_{weight}$) in the force models described above. In some embodiments, the method may comprise the process 802 of initializing one or more attractive weights ($B_{weight}$) of nodes of a set of cells or vertices of a graph representing a design. In some embodiments, the method may comprise the process 804 of determining or identifying a value for the constant K in the force models described above based at least in part on the design or graph. In some embodiments, process 804 determines or identifies the value for the constant K based on the number of nodes in the design, the number of vertices in the graph, or the number of edges in the graph.

In some embodiments, the method may comprise the process 806 of identifying FDP results (e.g., force-directed placement layout or floorplan) or performing the FDP process for design using one or more force models described herein. In some embodiments, the method may comprise the process 808 of determining a new set of cells or a modified graph based at least in part on the results of the force-directed placement or floorplanning process. In these embodiments, various force models may move at least some nodes in the set of cells used in 802 to new locations and thus change the cells that correspond to these at least some nodes.

For example, in some embodiments where the Voronoi decomposition process is used to partition a physical design space into a set of cells by using a set of nodes as the Voronoi generation nodes, the one or more force models used in the FDP process may move at least some of these Voronoi cell generation nodes and thus change the Voronoi cells as a result. In some embodiments, the method may comprise the process 810 of modifying the attractive weights of the nodes based at least in part on a first cell in the set of cells used in process 802 or the same first cell in the new set of cells determined at 808, as compared to the target area of the first cell.

In some embodiments, the attractive weight of a cell may be modified by using the following formula: $newB_{weight} = oldB_{weight} * (currentCellArea/targetCellArea)$. In these embodiments, the method makes cells that are bigger than they need to be (e.g., bigger than the target area(s)) to attract more and cells that are smaller than they need to be (e.g., smaller than the target area(s)) to attract less.

In some embodiments, the method may comprise the process 812 of determining whether one or more convergence or stopping criteria are satisfied. In some embodiments, the one or more convergence or stopping criteria comprises a standard deviation area error across some or all cells with respect to, for example, the target area. In some embodiments, the method configures or reconfigures the conductivity (e.g., process 306) to have a substantially uniform degree (e.g., 4) to reduce the number and/or magnitude(s) of outliers in the calculation of the standard deviation with respect to the target area error. In some embodiments where process 812 determines that the one or more convergence or stopping criteria are not satisfied, the method may return to 806 and repeat processes 806-812 until the one or more convergence or stopping criteria are satisfied. Otherwise, the method may proceed to 814 to continue with, for example, determining one or more other force models or performing the FDP process with one or more force models described herein, etc.

Figure 9:
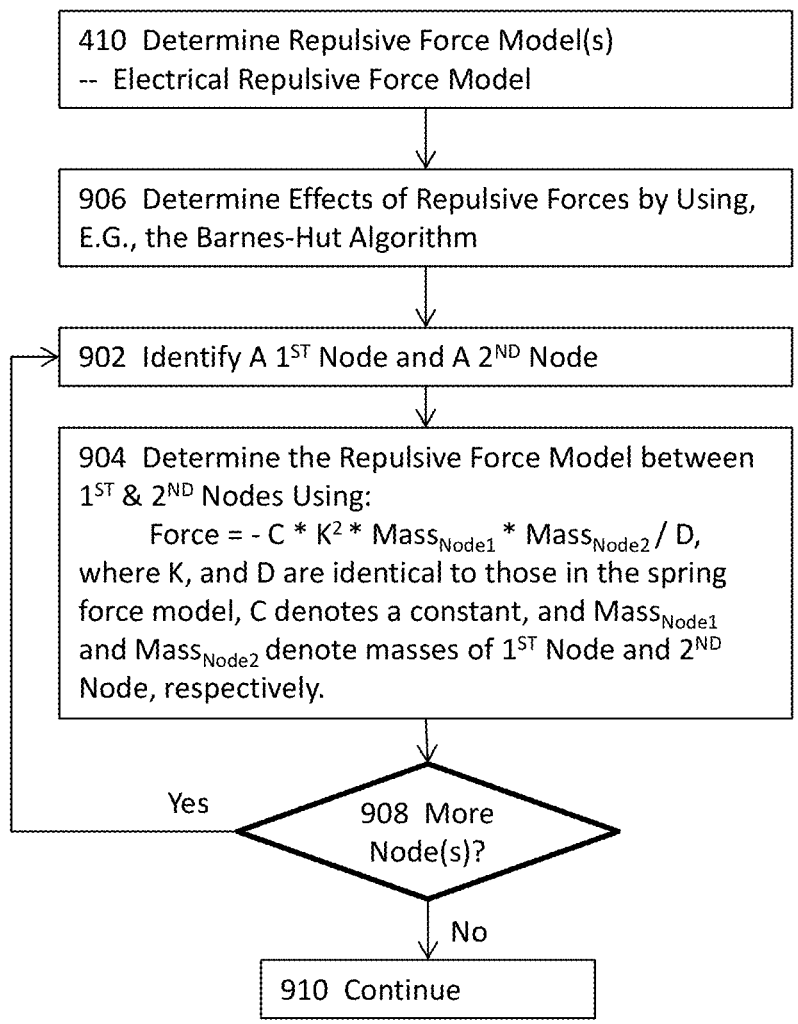
FIG. 9 illustrates more details about the top level flow diagram illustrated in FIG. 4 in some embodiments.

FIG. 9 illustrates more details about the top level flow diagram illustrated in FIG. 4 in some embodiments. More specifically, FIG. 9 illustrates a high level flow diagram of a method for determining an electrical repulsive model between two nodes (e.g., Voronoi generation nodes of two Voronoi cells) or two vertices in the graph (e.g., the graph constructed by process 308). In some embodiments, the process 410 may comprise the process 902 of identifying a first node and a second node from the layout. In some embodiments, the process 410 may comprise the process 904 of determining the repulsive force model between the first and the second nodes using at least the following formula:

$Force = -C*K^2*Mass_{Node1}*Mass_{Node2}/D$, where K, and D are identical to those in the spring force model, C denotes a constant that may be adjusted on a per-design basis, and $Mass_{Node1}$ and $Mass_{Node2}$ denote masses of $1^{ST}$ Node and $2^{ND}$ Node, respectively. Moreover, node masses allow for nodes having varying sizes to repulse other node(s) based on their masses. In some embodiments, the node mass ($Mass_{Node1}$ and $Mass_{Node2}$) is set to 1.0. In some embodiments, the node mass can be adjusted or weighted to reflect the area of the cell with which the node is associated.

In some embodiments, the process 410 may comprise the process 906 of determining the effects of the repulsive forces by building a quadtree as a basis for repulsive force calculation by using, e.g., the Barnes-Hut algorithm that reduces the set of the second nodes that need to be evaluated for each first nod by at least combining the second nodes at certain distance into virtual nodes that have a single location and bigger mass. In some embodiments, the process 410 may comprise the process 908 of determining whether there are more nodes to be processed. If process 908 determines that there are more nodes to be processed, process 410 may return to 902 and repeat the processes 902, 904, and 908 until all the nodes of interest have been processed. Otherwise, process 410 may proceed to 910 to continue with, for example, determining one or more other force models, performing the force-directed placement or floorplanning process, etc.

Figure 10:
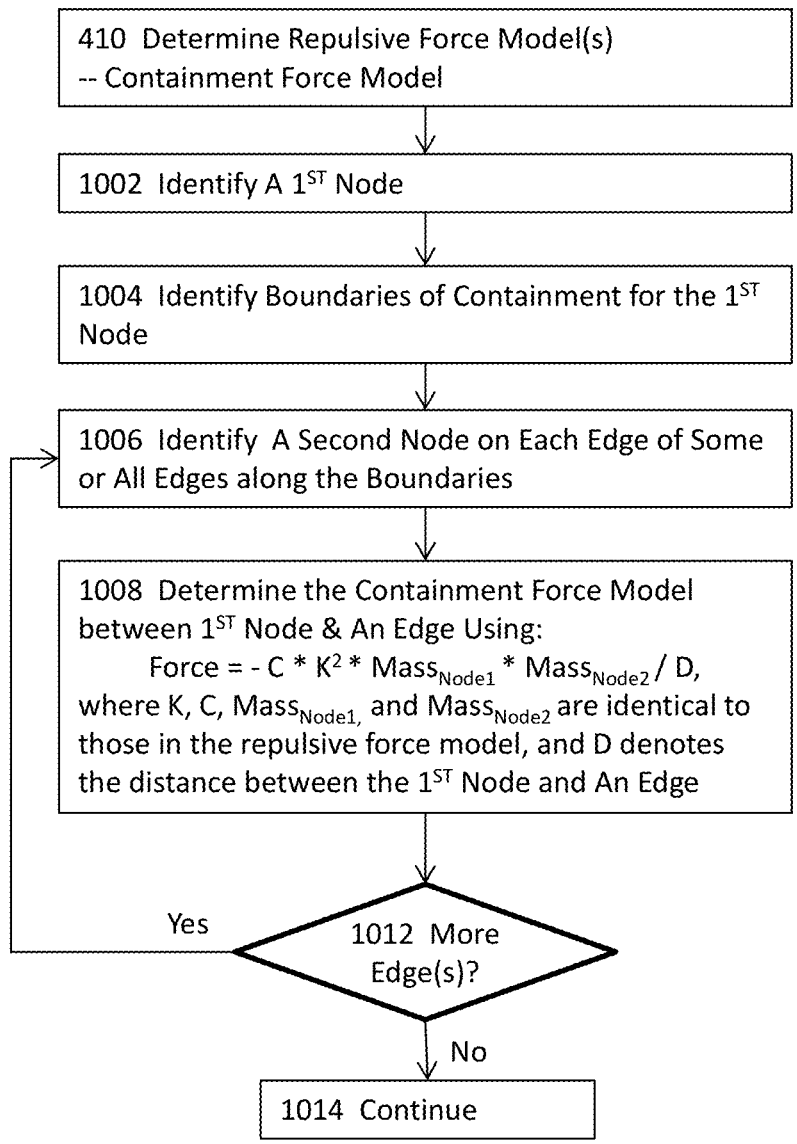
FIG. 10 illustrates more details about the top level flow diagram illustrated in FIG. 4 in some embodiments.

FIG. 10 illustrates more details about the top level flow diagram illustrated in FIG. 4 in some embodiments. More specifically, FIG. 10 illustrates the process 410 for determining the containment force model in some embodiments. The containment force is repulsive in nature to keep a graph contained within a boundary of the containment and thus follows a substantially similar form as the electrical repulsive force in some embodiments. A container may thus include, for example but not limited to the entire chip, an 10, or any physical entity within which a node needs to be confined in an electronic design in some embodiments, and thus the boundary may comprise the boundary of the entire chip, the boundary of an IO, or the boundary of any physical entity in these embodiments. In some embodiments, various methods described herein may use one or more containers to implement the graph layout at the global level, while simultaneously enforcing physical grouping requirements. In some embodiments, the process 410 may include the process 1002 of identifying a first node from a set of nodes such as but not limited to the Voronoi generation nodes that are used to generate a plurality of Voronoi cells for a physical design space of an electronic design.

In some embodiments, the process 410 may include the process 1004 of identifying boundaries of the containment for the first node. Any physical entity in the physical design (e.g., a cell, a pin, a terminal, etc.) may be used as the containment in these embodiments. In some embodiments, process 1004 uses an IO cell in an IO area of an electronic design as the containment and identifies the boundaries of the IO cell at 1004. In some embodiments, the process 410 may include the process 1006 of identifying one or more second nodes along each edge of some or all edges along the boundary of the containment. In some embodiments, process 1006 considers all edges of a container in determining the containment force model. In some embodiments, process 1006 identifies some but not all of the edges of a container in determining the containment force model. For example, process 1006 may identify four edges that are substantially, approximately, or roughly equally distributed around the first node within the container in the angular direction and then identify one or more second nodes for each of the four edges. In some embodiments, process 1006 identifies the entire edge, which is a collection of infinite number of points, for the determination of the containment force model. More details about process 1006 are described in subsequent paragraphs with reference to FIG. 10A.

In some embodiments, the process 410 may include the process 1008 of determining the containment force model between first node and the edge identified at 1006 by using at least the following formula:

Force=−C*$K^2$*$Mass_{Node1}$*$Mass_{Node2}$/D, where K, C, $Mass_{Node1}$, and $Mass_{Node2}$ are identical to those in the repulsive force model, and D denotes the distance between the first node and the identified edge. In these embodiments, the containment force model models the force exerted by the edges of a node's container in a vector form that acts on the node.

In some embodiments, both the $Mass_{Node1}$ and $Mass_{Node2}$ are identical (e.g., both having a value of 1.0). In some embodiments, the value of $Mass_{Node1}$ is different from that of $Mass_{Node2}$. In some embodiments, the mass of the first node ($Mass_{Node1}$) used in the containment force model may be different from the mass of the same first node used in the repulsive force model (e.g., the electrical repulsive force model in 904). In some embodiments, the mass of the second node depends on the length of the edge on which the second nodes is located. For example, the mass of the second node may be proportional to the length of the edge on which the second node is located. In some embodiments where process 1006 identifies more than one second node, process 1008 determines, for each identified second node, the distance (D in the above formula) between the first node and the second node and then determines the resultant force by using vector mathematics. In some embodiments where process 1006 identifies the entire edge, process 1008 integrates the force between a second node on the edge and the first node over the entire edge to determine the resultant force.

In some embodiments, the process 410 may include the process 1012 of determining whether there is another edge to process. If so, the method returns to 1006 and repeats processes 1006~1012 until all edges have been processed. Otherwise, the method proceeds to 1014 to continue with, for example, storing the force model.

Figure 10A:
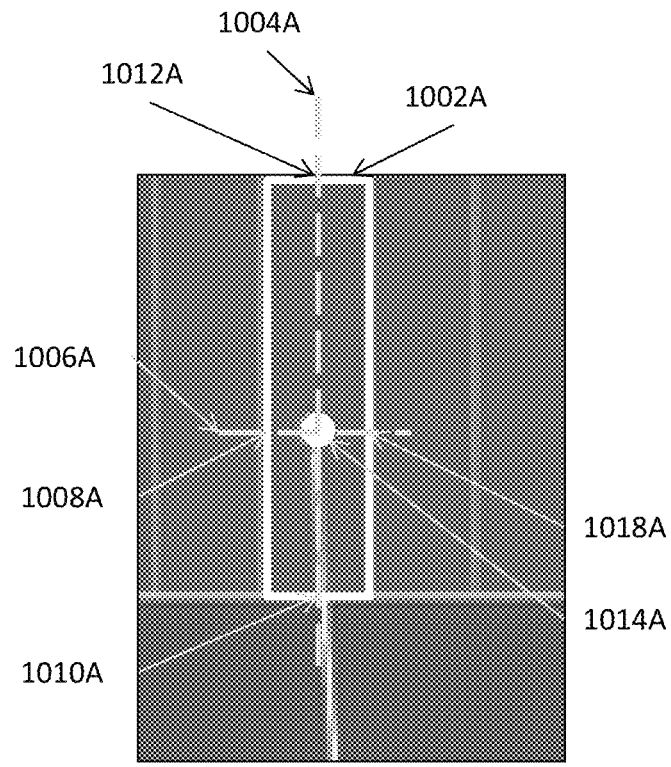
FIG. 10A illustrates an exemplary process to determine a second node from an edge of a container in some embodiments.
Figure 10A:
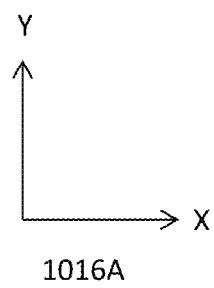

FIG. 10A illustrates an exemplary process to determine a second node from an edge of a container in some embodiments. More specifically, FIG. 10A illustrates a rectangular container 1002A that includes four vertical and horizontal edges and contains a first node 1014A such that the first node 1014A is confined within the container 1002 during the operation of one or more force models. It shall be noted that a container may have a different shape with a different number of edges in some embodiments. It shall also be noted that a container may not necessarily have horizontal or vertical edges in some embodiments.

In these embodiments illustrated in FIG. 10A, the method to determine a second node along an edge may include the process of constructing a first line 1004A that is perpendicular to at least one edge of the container through the first node. In this example, the first line 1004A represents a vertical line passing through the first node 1014A. The method may further comprise a second line 1006A that is perpendicular to another edge of the container. In the illustrated example, the second line 1006A represents a horizontal line passing the first node 1014A and perpendicular to the vertical edges. The method may then determine the second nodes as the intersections between the first line 1004A and the boundary of the container 1002A. In this example, the method thus identifies 1012A and 1010A as two second nodes. The method may similarly determine the second nodes as the intersections between the second line 1006A and the boundary of the container 1002A. In this example, the method thus identifies 1018A and 1008A as two additional second nodes along the vertical edges of the container.

In the above exemplary container 1014A with vertical and horizontal edges, the force model determining processes or models (e.g., process 1008 of FIG. 10) may determine the distances (D) by simply comparing, for example the difference in the Y coordinates in the exemplary X-Y coordinate system 1016A between the first node 1014A and the second node (e.g., 1010A or 1012A) or the difference in the X-coordinates between the first node 1014A and the second node (e.g., 1008A or 1018A).

In some embodiments where the container has a shape other than a square or a rectangular shape, or where the container includes an edge that is not parallel to the axes of the coordinate system, the method may use conformal mapping to map the container from a first space (e.g., the Euclidean space) to a second space (e.g., the complex space) such that the edge of interest is parallel to an axis of the coordinate system. The method may determine the second node in the second space and the force model and then transform the solutions back to the first space. In some other embodiments, where the container has a shape other than a square or a rectangular shape, or where the container includes an edge that is not parallel to the axes of the coordinate system, the method may directly determine the lines that are perpendicular to respective edges, determine the intersections and thus the corresponding distances between the first node and the second nodes, and then determine the force model using at least the distances. In the alternative, the method may directly determine the distances from the first node to the edges of interest without constructing the lines (e.g., 1004A and 1006A) and use the distances to determine the containment force model accordingly in some other embodiments.

In the above exemplary embodiments, a second node on an edge is determined as the intersection of a line that is normal to the edge and passes through the first node. Nonetheless, it shall be noted that the second node may be identified as any point along the edge on which the second is located. Identifying different second nodes along an edge may affect how the containment force model moves the first node and hence the final location of the first node and thus may ultimately affect the decomposition of the layout space due to the operations of one or more force models acting on the nodes including the first node. Nonetheless, the effects of random selection of second points may be insignificant or tolerable, especially for the purposes of confining the first node within its container in some embodiments.

In some embodiments, the process 410 may include the process 1012 of determining whether there is an additional edge along the boundaries of the containment to be processed. In some of these embodiments where process 1012 determines that there is an additional edge to be processed, the process 410 may return to 1006 to identify this additional edge and repeat the processes 1006~1012 until all the edges of interest have been processed. Otherwise, the process 410 may proceed to 1014 to continue with, for example, determining one or more other force models, performing the force-directed placement or floorplanning process, etc.

Figure 11:
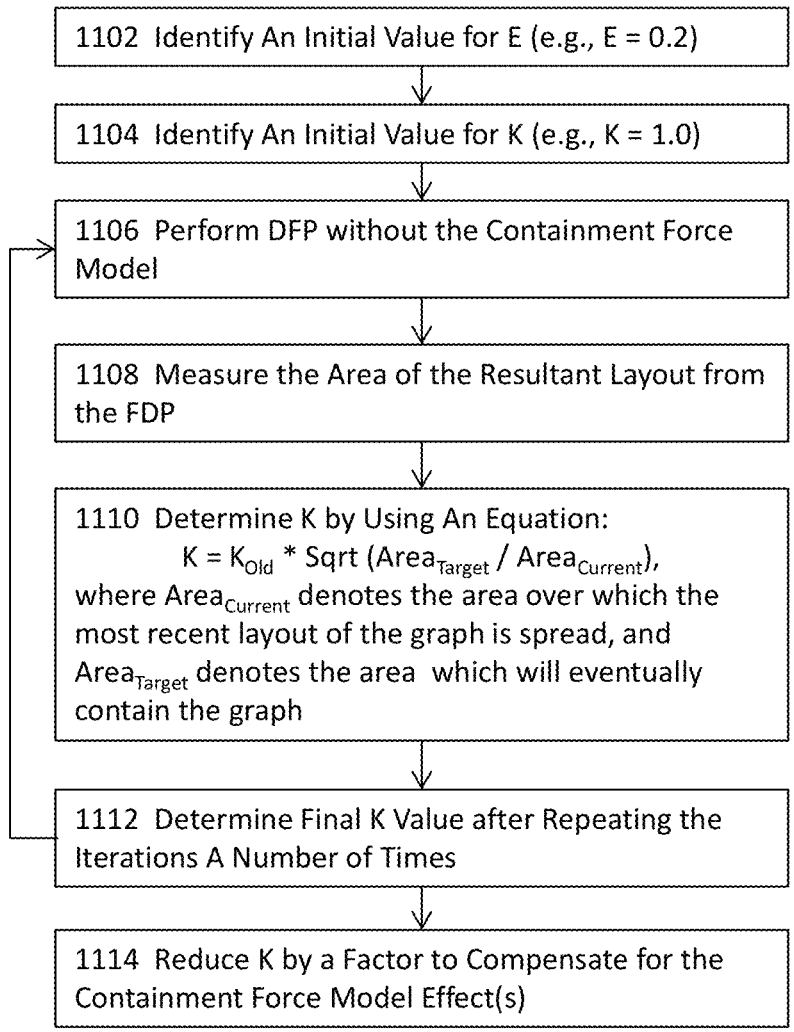
FIG. 11 illustrates more details about one or more force models in some embodiments.

FIG. 11 illustrates more details about one or more force models in some embodiments. More specifically, FIG. 11 illustrates a top level flow diagram of the method for determining the constants K and E used in various force models in one or more embodiments. In some embodiments, the method may comprise the process 1102 of identifying an initial value for the constant E. In some embodiments, the process may identify the initial value of 0.2 for the constant C. In some embodiments, the method may comprise the process 1104 of identifying an initial value for the constant K. In some embodiments, the process may identify the initial value of 1.0 for the constant K. In some embodiments, the method may comprise the process 1106 of performing the force-directed placement or floorplanning process without using the containment force model. In some embodiments, the method may comprise the process 1108 of measuring the resulting size of the layout of the electronic design.

In some embodiments, the method may comprise the process 1110 of determining the value of the constant K by using at least the following formula:

$K=K_{old}*sqrt(Area_{Target}/Area_{current})$, where $Area_{current}$ denotes the area over which the most recent layout of the graph is spread, and $Area_{Target}$ denotes the target area which will eventually contain the graph layout. In some embodiments, the value of the constant K may be adjusted or determined such that the total amount of attractive force is about four times greater than the amount of repulsive force.

In some embodiments, the method may comprise the process 1112 of determining the final value for the constant K after iteratively repeating the processes 1106~1110 for a number of times. In some embodiments, process 1112 repeats the processes 1106~1110 for 10 times. In some embodiments, the method may comprise the process 1114 of reducing the value of the constant K by a factor to compensate for the containment force model effects. In some embodiments, the factor is 0.8. In these embodiments where the value of the constant K determined at 1112 is reduced to the attractive force vector more dominant. Some conventional approaches use empirical values for the values of similar constants.

The embodiments illustrated in FIG. 11 and described above provides a more analytical process to determine more realistic values for the constants K and E, without using any empirical values. Moreover, it shall be noted that the ratio between the values of constants K and C may be more significant than their respective, absolute values in some embodiments because both constants K and C are utilized in both the spring attractive force model and the electrical repulsive force model. Therefore, the above process first identifies an initial value of C and then iteratively determines the value of K in these embodiments. In addition, the initial value of E may be identified to be other numeric values at 1102 because the subsequent processes will automatically adjust the final value of K accordingly in these embodiments.

Figure 12:
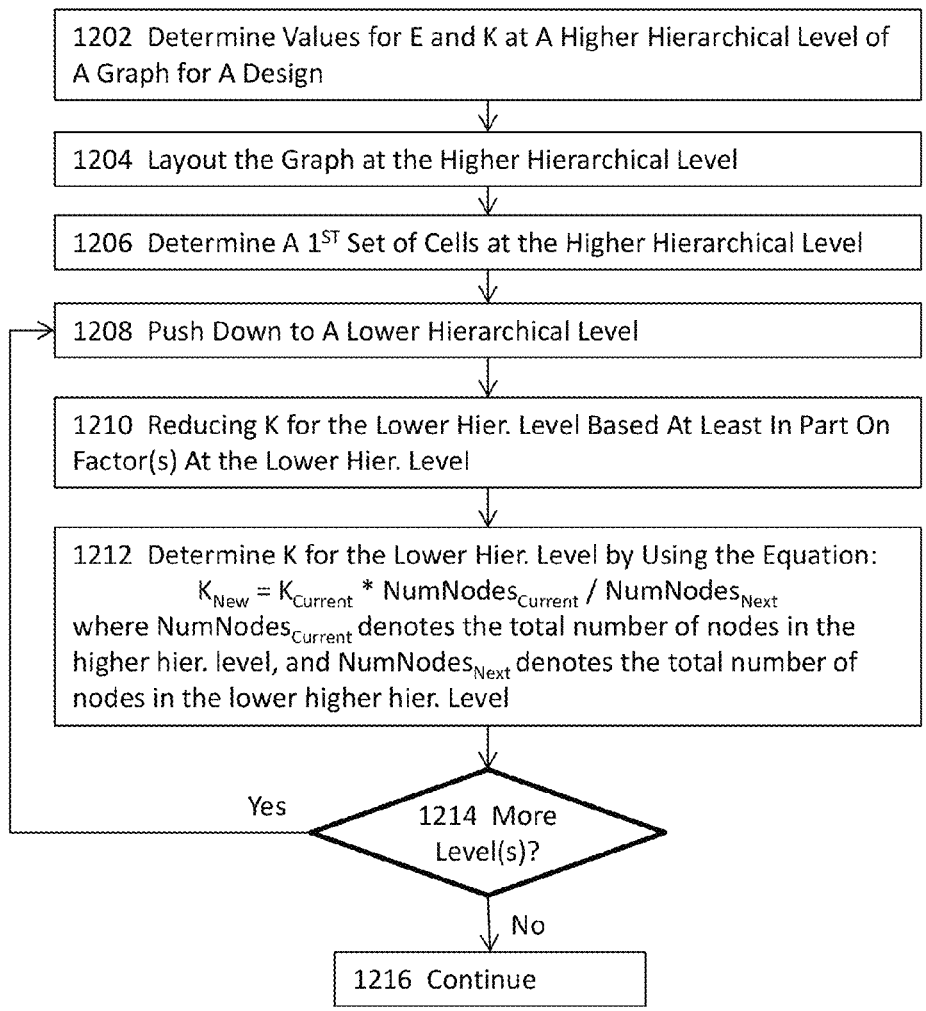
FIG. 12 illustrates a top level flow diagram for determining one or more force models for a physical design having multiple hierarchical levels in some embodiments.

FIG. 12 illustrates a top level flow diagram for determining one or more force models for a physical design having multiple hierarchical levels in some embodiments. In one or more embodiments, the method may comprise the process 1202 of determining the values for the constants E and K at a higher hierarchical level of a graph (e.g., the graph constructed by process 308) for an electronic design. In some embodiments, the method may comprise the process 1204 of laying out the graph at the higher hierarchical level.

In some embodiments, the method may comprise the process 1206 of determining a first set of cells for the electronic design at the higher hierarchical level. In some embodiments, the method may comprise the process 1208 of pushing down to a lower hierarchical level that is situated at a lower level than the higher hierarchical level. In some embodiments, the method may comprise the process 1210 of reducing the value for the constant K for the lower hierarchical level based at least in part on one or more factors at the lower hierarchical level. In some embodiments, the one or more factors may include, for example, the number of vertices (or nodes), the number of edges, the radius of the graph for the lower hierarchical level, etc.

In some embodiments, the method may comprise the process 1212 of determining the value of the constant K for the lower hierarchical level by using at least the following formula:

$K_{New}=K_{Current}*NumNodes_{current}/NumNodes_{Next}$ where $NumNodes_{current}$ denotes the total number of nodes in the higher hierarchical level, and $NumNodes_{Next}$ denotes the total number of nodes in the lower higher hierarchical level. In some embodiments, the method may determine the value of the constant K by using the number of edges in the lower level of the graph, rather than by using the number of nodes as described above. In some embodiments, the method may determine the value of the constant K by using the radius of the graph, rather than by using the number of nodes or the number of edges. In graph theory, the radius y of a graph is the minimum eccentricity of any vertex, where the eccentricity of a vertex is the greatest geodesic distance between and any other vertex.

In some embodiments, the method may comprise the process 1214 of determining whether there is an additional, lower hierarchical level to process. In some embodiments where there is an additional, lower hierarchical level to process, the method may return to 1208 and repeat processes 1208~1214 until all the lower hierarchical levels have been processed. Otherwise, the method may proceed to 1216 to continue with, for example, further processing the design.

Figure 13:
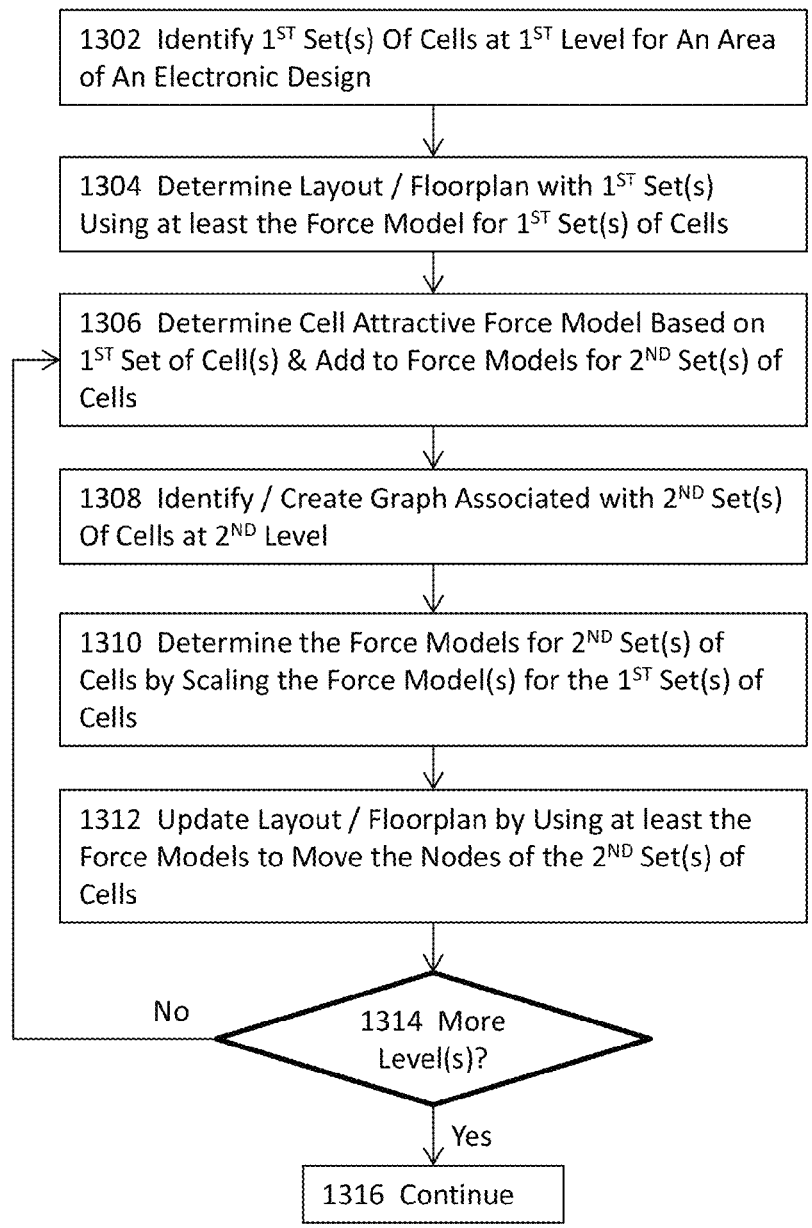
FIG. 13 illustrates a top level flow diagram for implementing a physical design having multiple hierarchical levels using one or more force models in some embodiments.

FIG. 13 illustrates a top level flow diagram for implementing a physical design having multiple hierarchical levels using one or more force models in some embodiments. In one or more embodiments, the method illustrated in FIG. 13 may comprise the process 1302 of identifying a first sets of cells at a first hierarchical level for an area of an electronic design. In some embodiments where a top-down approach is adopted, the first hierarchical level represents the highest hierarchical level of the electronic design.

In some embodiments, the method may comprise the process 1304 of determining the placement layout or the floorplan using at least one or more force models described herein on the first set of cells. For example, the method may determine to use one or more attractive force models, one or more repulsive force models, a containment force model, and a cell-based force model for a user-defined, physical electronic design (e.g., the edges or nodes in a graph layout comprise user-defined elements) in some embodiments.

The method may also determine to use one or more attractive force models (e.g., Voronoi attractive force model or cell attractive force model) and a containment force model for a physical electronic design that is derived by using the Voronoi-based graph layout to drive a Voronoi diagram to the target area convergence or stopping criterion in some embodiments. The method may also determine to use one or more attractive force models (e.g., Voronoi attractive force model or cell attractive force model), one or more repulsive force models, and a containment force model for a physical electronic design that is derived by using the Voronoi-based graph layout to drive a Voronoi diagram to the target area convergence or stopping criterion in some embodiments.

In some embodiments, the method may comprise the process 1306 of determining the cell attractive force model based at least in part on the first set of cell and adding the cell attractive force model to the force models that are used for the second sets of cells. In these embodiments, the additional cell attractive force model will also be used to calculate the attractive force vectors, in addition to the other force model(s).

In some embodiments, the method may comprise the process 1308 of identifying or creating a graph by using the second set of cells at the second hierarchical level. In some embodiments, the graph includes vertices, each of which represents a cell in the second set, and edges, each of which indicates two nodes are connected in the graph as indicated by the conductivity information.

In some embodiments, the method may comprise the process 1310 of determining the force models that are used for the second set of cells at the second hierarchical level by scaling or modifying the corresponding force models for the first set of cells at the first hierarchical level. The details of process 1310 are described in the preceding paragraphs with reference to FIG. 12.

In some embodiments, the method may comprise the process 1312 of updating the placement layout or the floorplan by using at least the force models to move the nodes of the second set of cells. In some embodiments, the method iteratively moves the nodes of the second set of cells until one or more convergence or stopping criteria are satisfied.

Figure 14A:
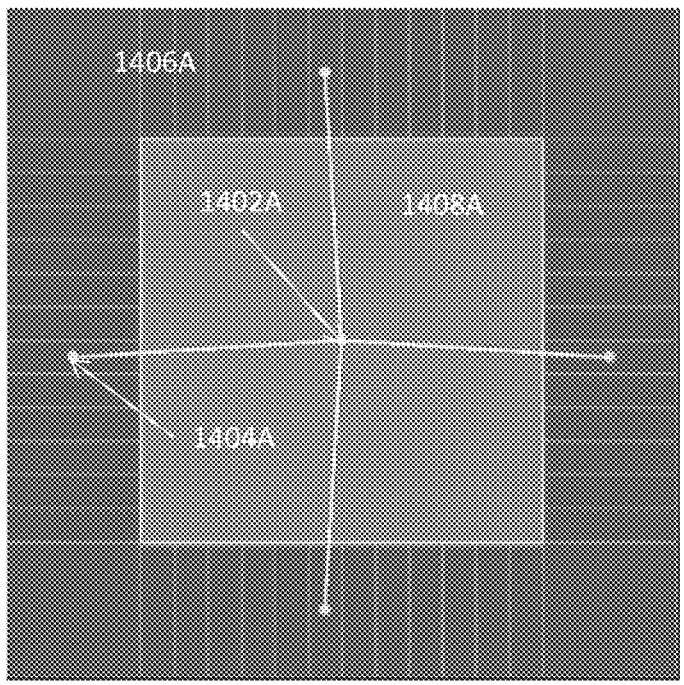
FIG. 14A-L illustrate the generation of an exemplary floorplan or a placement layout during the implementation of the corresponding physical design using one or more force models operating on sets of cells representing the a physical design space of the physical design in some embodiments.

In some embodiments, the method may comprise the process 1314 of determining whether there is an additional hierarchical level to be further processed. In some embodiments where there is an additional hierarchical level to be further processed, the method may return to 1306 and repeat the processes 1306~1314 until all the levels of interest have been processed. Otherwise, the method may proceed to 1316 to continue with, for example, storing the generated FIG. 14A-L illustrate the generation of an exemplary floorplan or a placement layout during the implementation of the corresponding physical design using one or more force models operating on sets of cells representing the a physical design space of the physical design in some embodiments. FIG. 14A illustrates an electronic design with a core area 1408A and an IO area 1406A. The electronic design is associated with a custom conductivity information (e.g., user-specified conductivity) that requires that node 1402A communicate with four other nodes (1404A) in the IO area 1406A.

Figure 14B:
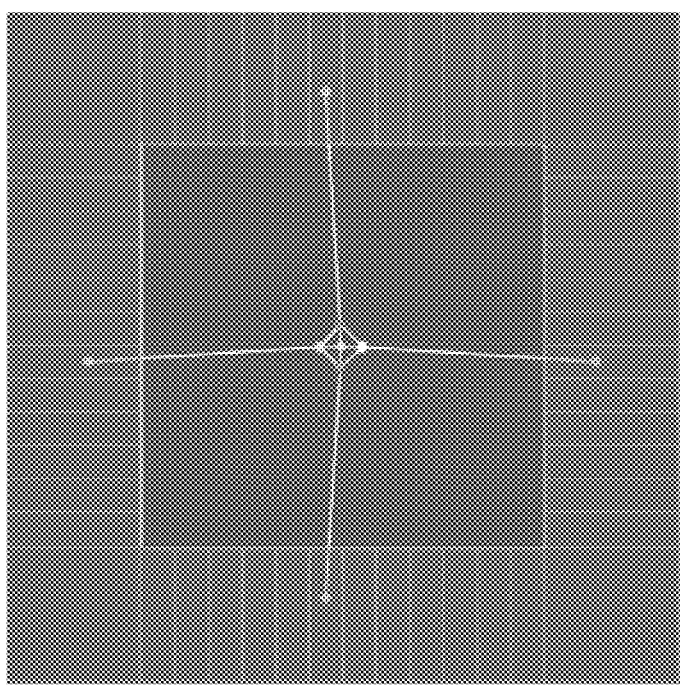
Figure 14C:
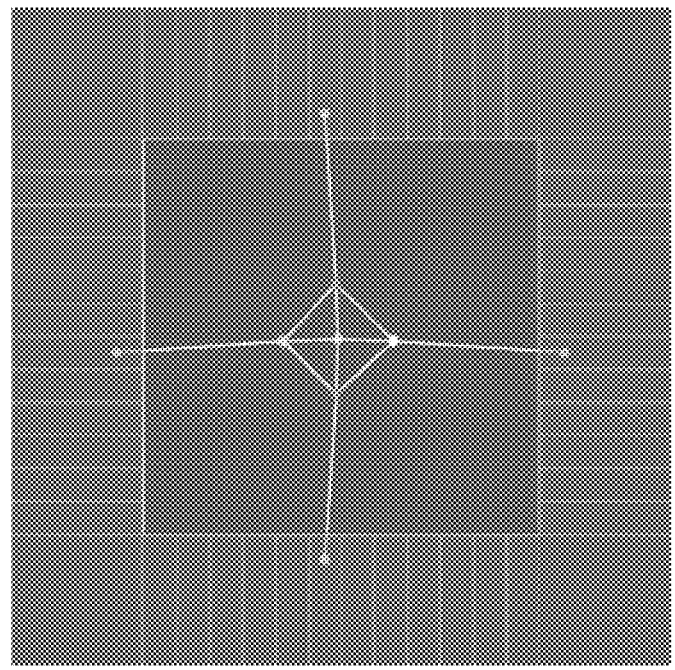
Figure 14D:
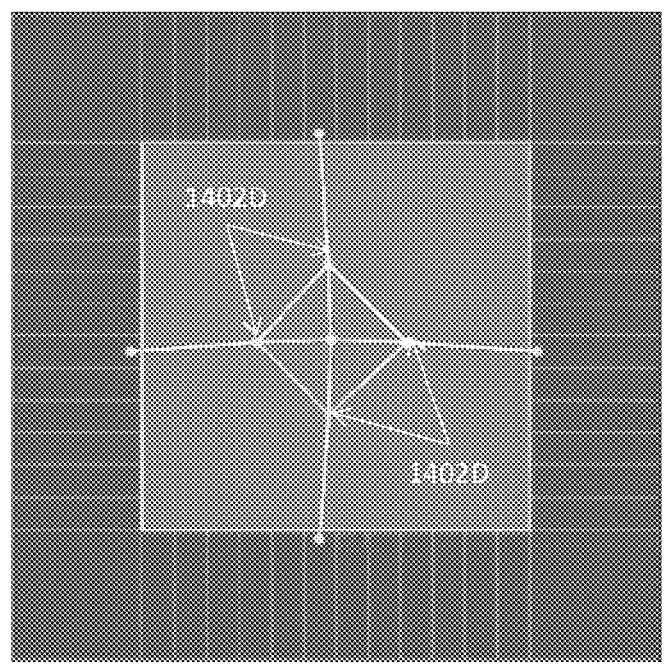
Figure 14E:
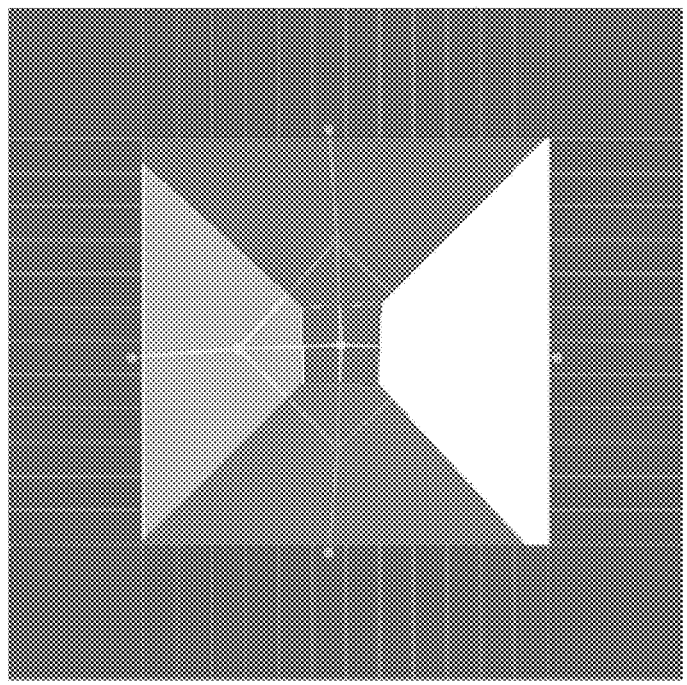
Figure 14F:
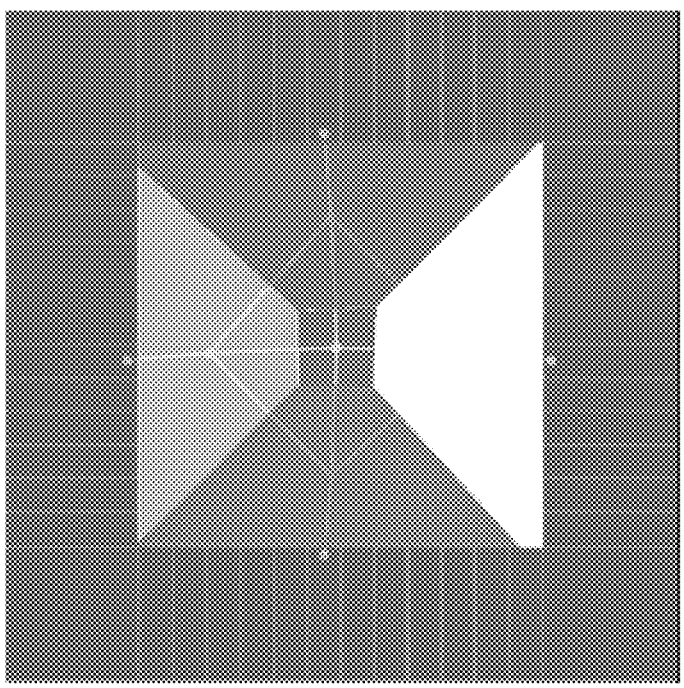
Figure 14G:
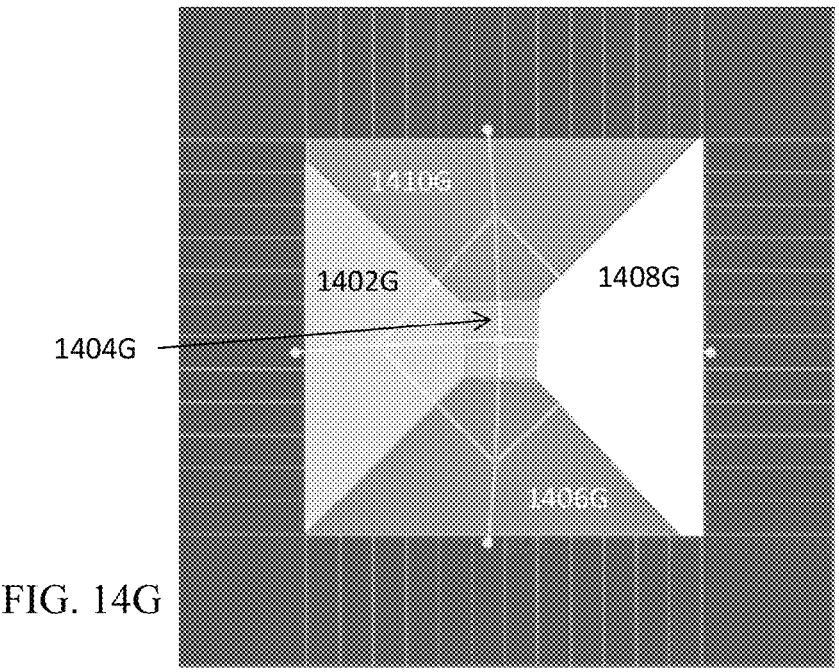
Figure 14H:
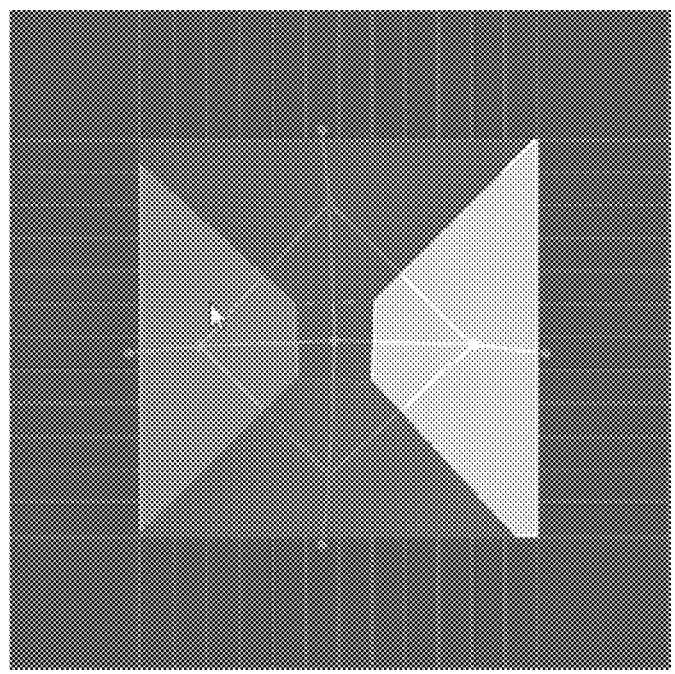
Figure 14I:
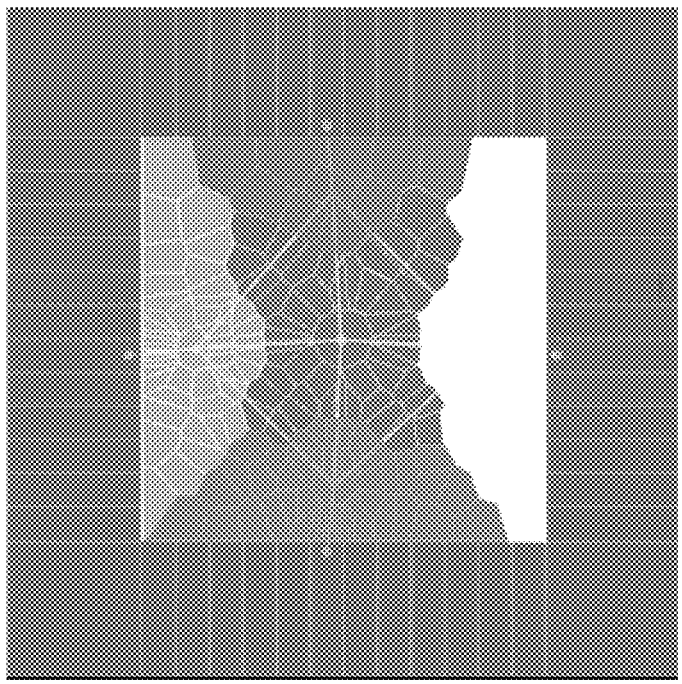
Figure 14J:
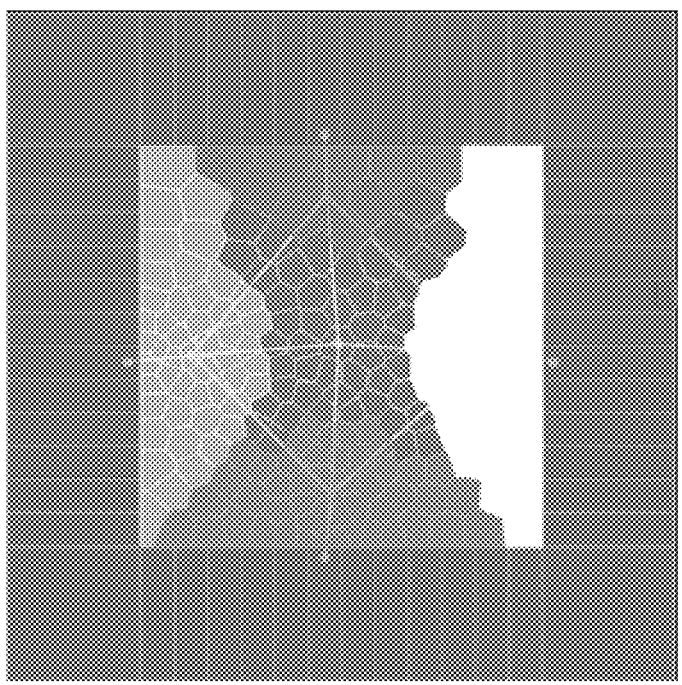

FIGS. 14B-D shows how the nodes (e.g., 1402D in FIG. 14D) are continuously moved by using one or more force models described herein until one or more criteria (e.g., a minimum energy level) are satisfied. It shall be noted that the conductivity is maintained during the performance of the force directed placement or floorplanning process. FIGS. 14E-H illustrate the generation of the Voronoi cells by using the five nodes in, for example, FIG. 14D. FIGS. 14E-H further illustrate the four nodes in the cells, for example, 1402G, 1406G, 1408G, and 1410G are moved as the Voronoi cells are generated by using the force models described herein. It shall be noted that the one or more convergence or stopping criteria do not include the target area criterion in FIGS. 14A-G, and thus the five cells have different sizes.

Figure 14K:
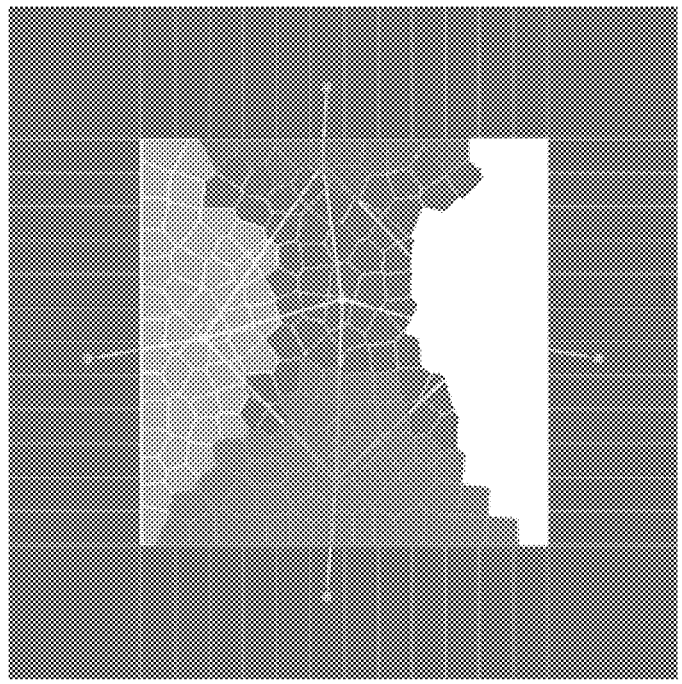
Figure 14L:
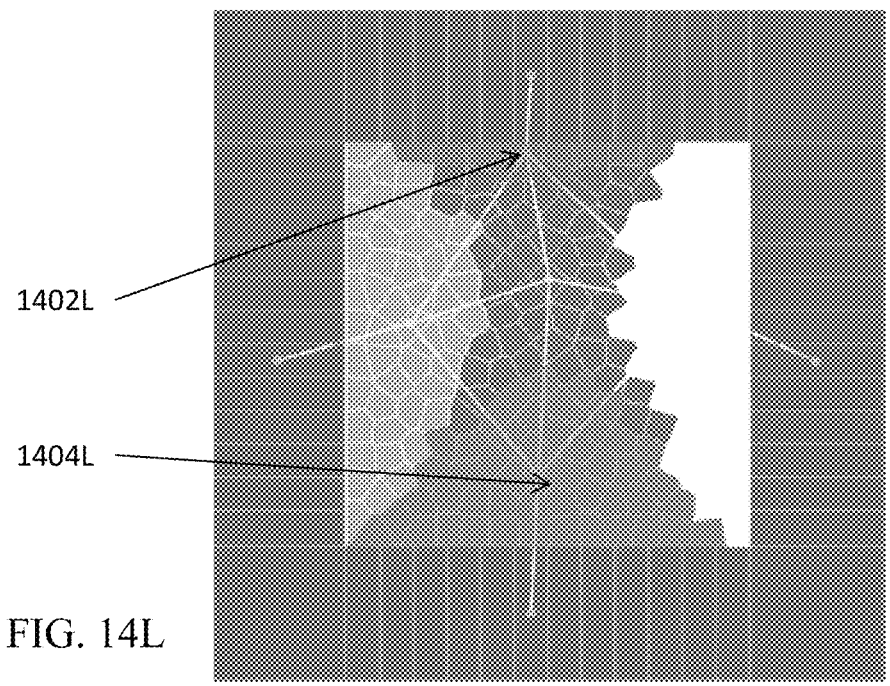

FIGS. 14I-L illustrates decomposing a larger Voronoi cell into a plurality of smaller Voronoi cells where each of the five larger Voronoi cells (e.g., 1402G, 1406G, 1408G, and 1410G) is further represented by a plurality of Voronoi cells. It shall be noted that FIGS. 14K-L illustrate the result of applying the size constraint that requires the area of region 1402L be approximately one-fifth (⅕) of any of the other four regions. As it may be seen from FIG. 14K, approximately five times as many nodes are introduced in region 4104L than in region 1402L and iteratively performs the Voronoi decomposition with, for example, one or more force models described herein. FIGS. 14K-L illustrate the final Voronoi decomposition of the core area in which region 1402L has approximately one-fifth (⅕) the size of region 1404L. It shall be noted that the conductivity, as specified in FIG. 14A, is nonetheless maintained throughout the entire process from FIG. 14A to FIG. 14L.

Figure 15A:
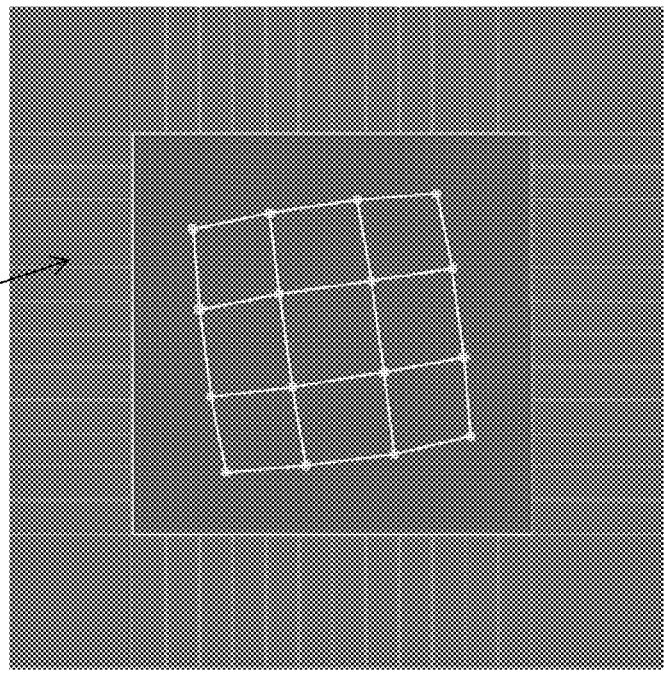
FIGS. 15A-C illustrate the generation of another exemplary floorplan or a placement layout during the implementation of the corresponding physical design using one or more force models operating on sets of cells representing the a physical design space of the physical design in some embodiments.
Figure 15B:
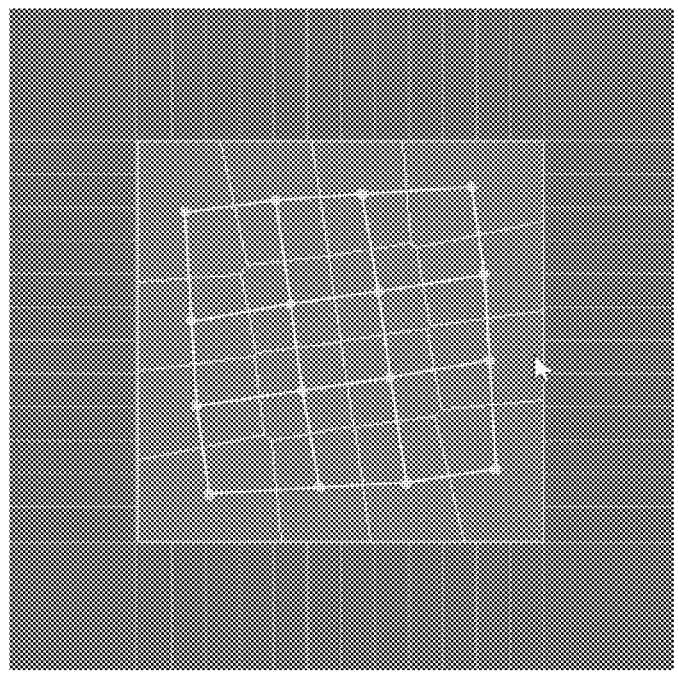
Figure 15C:
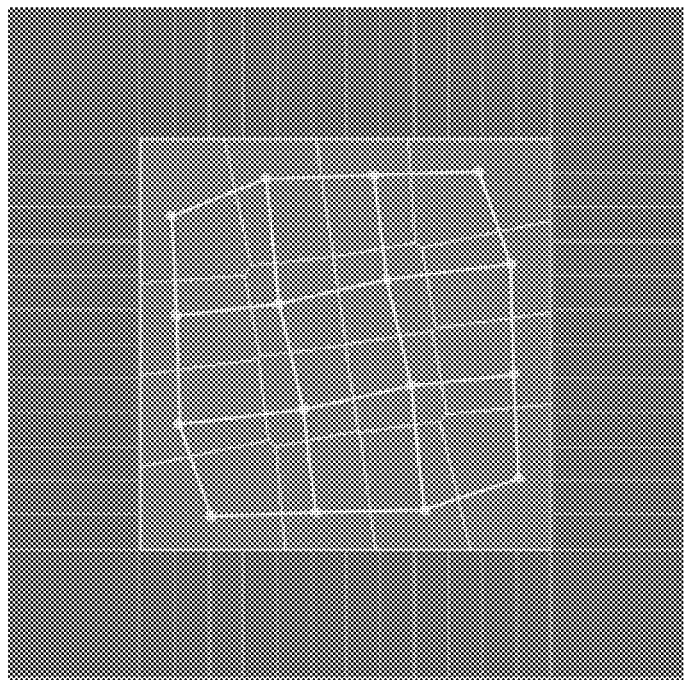
Figure 15D:
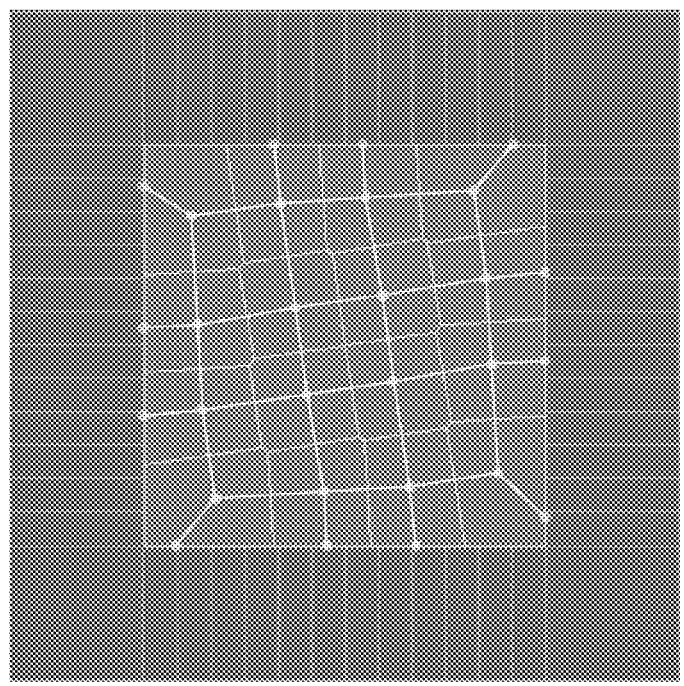
FIG. 15D illustrates the generation of another exemplary floorplan or a placement layout during the implementation of the corresponding physical design using one or more force models operating on sets of cells representing the a physical design space of the physical design in some embodiments.

FIG. 15A-D illustrate the generation of another exemplary floorplan or a placement layout during the implementation of the corresponding physical design using one or more force models operating on sets of cells representing the a physical design space of the physical design in some embodiments. FIG. 15A illustrates the graph layout of a 4×4 grid having 16 nodes. FIG. 15B illustrates the generated Voronoi cells based on the 16 Voronoi generation nodes. It shall be noted that neither the vertices in either the graph layout of FIG. 15A nor the nodes in FIG. 15B are connected to any of the IO cells (e.g., 1502A.) FIGS. 15C-D illustrates the iterative operations of the force model(s) on the nodes to move the nodes to locations where one or more convergence or stopping criteria (e.g., a target area criterion or a minimum or reduced energy level, etc.) are satisfied. FIG. 15D further illustrates anchoring the cells at the edges of the core area to the corresponding IO cells in the IO area.

SYSTEM ARCHITECTURE OVERVIEW

Figure 16:
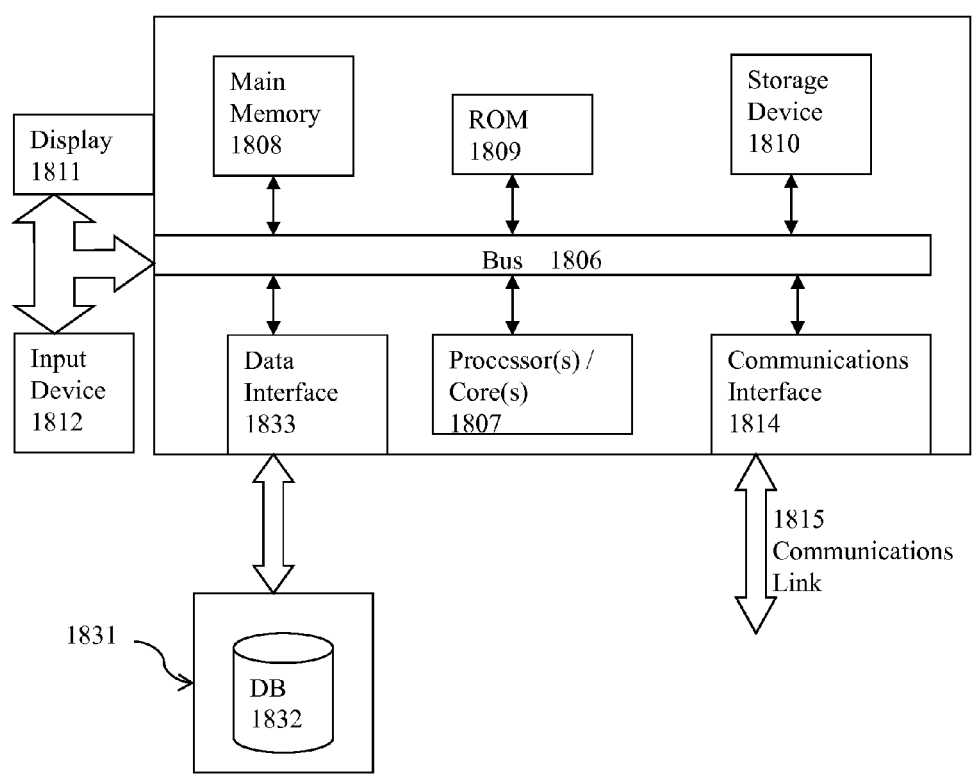
FIG. 16 illustrates a block diagram of an illustrative computing system 1800 suitable for implementing various embodiments described here.

FIG. 16 illustrates a block diagram of an illustrative computing system 1800 suitable for implementing various embodiment of the invention. For example, the exemplary computing system 1800 may be used to implement various processes as described in the preceding paragraphs and the figures such as various processes or modules of determining whether the first post is of interest, various analysis processes or modules, various other determining processes or modules, various processes or modules for performing various actions, etc. as described in the remainder of the application. Computer system 1800 includes a bus 1806 or other communication mechanism for communicating information, which interconnects subsystems and devices, such as processor 1807, system memory 1808 (e.g., RAM), static storage device 1809 (e.g., ROM), disk drive 1810 (e.g., magnetic or optical), communication interface 1814 (e.g., modem or Ethernet card), display 1811 (e.g., CRT or LCD), input device 1812 (e.g., keyboard), and cursor control (not shown).

According to one embodiment of the invention, computer system 1800 performs specific operations by one or more processors or processor cores 1807 executing one or more sequences of one or more instructions contained in system memory 1808. Such instructions may be read into system memory 1808 from another computer readable/usable storage medium, such as static storage device 1809 or disk drive 1810. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention. In the single embodiment or in some embodiments, the one or more processors or processor cores 1807 may be used to perform various actions such as various actions, processes, or modules involving determining, analyzing, performing actions, etc. In some embodiments, at least one of the one or more processors or processor cores 1807 has the multithreading capability.

In one embodiment, the term "logic" shall mean any combination of software or hardware that is used to implement all or part of the invention. In the single embodiment or in some embodiments, the one or more processors or processor cores 1807 may be used to perform various acts such as various acts involving determining, analyzing, performing actions, etc. In some embodiments, at least one of the one or more processors or processor cores 1807 has the multithreading capability to execute a plurality of threads to perform various tasks as described in the preceding sections.

Various actions as described in the preceding paragraphs may be performed by using one or more processors, one or more processor cores, or combination thereof 1807. For example, various processes or modules involving the determining action, various analysis processes or modules, etc. may be performed by one or more processors, one or more processor cores, or combination thereof.

The term "computer readable storage medium" or "computer usable storage medium" as used herein refers to any non-transitory medium that participates in providing instructions to processor 1807 for execution. Such a medium may take many forms, including but not limited to, non-volatile media and volatile media. Non-volatile media includes, for example, optical or magnetic disks, such as disk drive 1810. Volatile media includes dynamic memory, such as system memory 1808.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment of the invention, execution of the sequences of instructions to practice the invention is performed by a single computer system 1800. According to other embodiments of the invention, two or more computer systems 1800 coupled by communication link 1815 (e.g., LAN, PTSN, or wireless network) may perform the sequence of instructions required to practice the invention in coordination with one another.

Computer system 1800 may transmit and receive messages, data, and instructions, including program, i.e., application code, through communication link 1815 and communication interface 1814. Received program code may be executed by processor 1807 as it is received, and/or stored in disk drive 1810, or other non-volatile storage for later execution. In an embodiment, the computer system 1800 operates in conjunction with a data storage system 1831, e.g., a data storage system 1831 that contains a database 1832 that is readily accessible by the computer system 1800. The computer system 1800 communicates with the data storage system 1831 through a data interface 1833. A data interface 1833, which is coupled to the bus 1806, transmits and receives electrical, electromagnetic or optical signals that include data streams representing various types of signal information, e.g., instructions, messages and data. In embodiments of the invention, the functions of the data interface 1833 may be performed by the communication interface 1814.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for implementing physical designs using one or more force models, comprising:
    using at least one processor to perform a process, the process comprising:
    identifying a first set of cells representing a physical design area of an electronic design, wherein the at least one processor partitions the physical design area into the first set of cells, and the first set of cells are non-overlapping and need no overlap resolution;
    determining one or more force models using at least the first set of cells, wherein at least one force model of the one or more force models is used to exert force on one or more nodes of a cell; and
    anchoring a first cell in the first set of cells by using a containment force model of the one or more force models to exert one or more forces on at least a part of the first cell.

2. The computer implemented method of claim 1, in which the process further comprises:
    identifying incomplete conductivity information for the electronic design; and
    generating a placement layout or a floorplan by using one or more force models to iteratively morph the first set of cells.

3. The computer implemented method of claim 2, in which the act of generating a placement layout or the floorplan is iteratively performed until one or more convergence criteria are satisfied.

4. The computer implemented method of claim 1, in which the process further comprises:
    reconfiguring the conductivity for the first set of cells to have a substantially uniform degree.

5. The computer implemented method of claim 1, in which the act of determining the one or more force models comprises:
    identifying one or more characteristics of elements of a graph that is constructed by using at least the first cell.

6. The computer implemented method of claim 5, in which the act of identifying the one or more characteristics of the elements of the graph comprise determining whether the elements of the graph are constructed by using Voronoi cells.

7. The computer implemented method of claim 5, in which the act of determining the one or more force models further comprises:
    identifying a first node connected to a second node in the graph based at least in part upon conductivity information; and
    determining one or more attractive force models for the first node.

8. The computer implemented method of claim 7, in which the one or more attractive force models comprise at least one of a cell-based attractive force model and a cell attractive force model.

9. The computer implemented method of claim 8, in which the cell-based attractive force model adds a plurality of child nodes to a parent cell in the first set of cells at a higher hierarchical level and models attractive forces between at least some of the plurality of child nodes and a parent node of the parent cell.

10. The computer implemented method of claim 8, in which the cell attractive force model for a cell depends on an attractive weight of another cell.

11. The computer implemented method of claim 10, the process further comprising:
determining the attractive weight of the another cell based at least in part upon an iteratively evolving area of the another cell.

12. The computer implemented method of claim 5, in which the act of determining the one or more force models further comprises:
identifying a third node in the graph; and
determining one or more repulsive force models for the third node.

13. The computer implemented method of claim 10, in which the one or more repulsive force models comprise a containment force model.

14. The computer implemented method of claim 1, in which the act of anchoring the first cell in the first set of cells by using the containment force model further comprises:
determining the containment force model for a first node of the first cell.

15. The computer implemented method of claim 14, in which the act of anchoring the first cell in the first set of cells by using the containment force model further comprises:
identifying the first node of the first cell;
identifying boundary of a containment for the first node; and
determining a repulsive force between the boundary and the first node, wherein the repulsive force is inversely proportional to a distance between the first node and the boundary.

16. The computer implemented method of claim 15, in which the act of determining the repulsive force between the boundary and the first node comprises:
identifying an edge along the boundary of the containment for the first node; and
determining the repulsive force based at least in part upon the distance and a mass of the first node, and a mass of the edge.

17. The computer implemented method of claim 1, in which process further comprises:
determining a common modifier for both an attractive force model and a repulsive force model, wherein the act of determining the common modifier comprises:
identifying a first value of the common modifier;
operating on the first set of cells using the attractive force model or the repulsive force model without using the containment force model for a number of iterations; and
iteratively modifying the first value of the common modifier by using at least a characteristic of a cell in the first set of cells in each iteration of the number of iterations.

18. The computer implemented method of claim 7, the act of determining the one or more attractive force models for the first node comprising:
identifying the second node that is connected to the first node;
determining a first attractive force model of the one or more attractive force model based at least in part upon an edge weight of an edge connecting the first node and the second node; and
identifying or determining a summation of forces on the first node by using at least the first attractive force model.

19. The computer implemented method of claim 7, the act of determining the one or more attractive force models for the first node comprising:
identifying a force directed placement result for a first set of cells;
identifying or determining a first point of the first set of cells as a first fictitious node for the first set of cells;
identifying the force directed placement result for a second set of cells; and
identifying or determining a force model of the one or more attractive force models by using the fictitious node.

20. The computer implemented method of claim 19, wherein the first set of cells reside on a first hierarchy of the electronic design, the second set of cells reside on a second hierarchy of the electronic design, and the first hierarchy is at a higher hierarchical level than the second hierarchy.

21. The computer implemented method of claim 7, the act of determining the one or more attractive force models for the first node comprising:
identifying or determining the graph for at least the first cell; and
identifying or determining a second attractive force model of the one or more attractive force model based at least in part upon an attractive weight of a vertex for the first cell.

22. The computer implemented method of claim 21, wherein the second attractive force model is identified or determined based at least further in part upon one or more characteristics of the first cell and a neighboring cell of the first cell.

23. The computer implemented method of claim 1, the process further comprising:
identifying or determining a first attractive weight of a first node of a first cell in the first set of cells;
identifying or determining one or more force models by using at least the first attractive weight;
identifying or determining a force directed placement result for the electronic design by using at least the one or more force models; and
identifying or determining a second set of cells based at least in part upon the force directed placement result.

24. The computer implemented method of claim 23, the process further comprising:
modifying the first attractive weight of the first node of the first cell in the first set of cells; and
determining whether or not a convergence criterion is satisfied.

25. The computer implemented method of claim 12, the act of determining the one or more repulsive force models for the third node comprising:
identifying or determining an effect of a repulsive force;
identifying an adjacent node neighboring the third node; and
identifying or determining a first repulsive force model between the adjacent node and the third node based at least in part upon the effect and respective characteristics of the third node and the adjacent node.

26. The computer implemented method of claim 1, further comprising:

identifying or determining a first initial value for a first constant;

identifying or determining a second initial value for a second constant;

identifying or determining a result ant layout portion by at least performing force directed placement with the first initial value and the second initial value without using the containment force model; and identifying or determining a geometric characteristic of the layout portion.

27. The computer implemented method of claim 26, further comprising:

identifying or determining a second value for the second constant based at least in part upon the geometric characteristic; and identifying or determining a candidate value for the second constant by at least performing the force directed placement for a number of times without using the containment force model.

28. The computer implemented method of claim 27, further comprising:

identifying or determining a final value for the second constant by at least reducing the candidate value by a factor based at least in part upon one or more attributes of the containment force model.

29. The computer implemented method of claim 1, the process further comprising:

identifying or determining a first plurality of cells representing a first decomposition of the physical design area of the electronic design;

identifying or determining a first graph for the physical design area using at least the first plurality of cells; and identifying a common modifier for both an attractive force model and a repulsive force model for the physical design area.

30. The computer implemented method of claim 29, the process further comprising:

identifying or creating a second graph representing a second decomposition of the physical design area of the electronic design.

31. The computer implemented method of claim 30, the process further comprising:

reducing the common modifier for the physical design area to form a reduced common modifier based at least in part upon a first number of nodes in the first graph and a second number of nodes in the second graph.

32. The computer implemented method of claim 31, the process further comprising:

modifying the first force model for the physical design area by replacing the common modifier in the first force model by the reduced common modifier.

33. An article of manufacture comprising a non-transitory computer readable storage medium storing thereupon a sequence of instructions which, when executed by at least one processor or at least one processor core, causes the at least one processor or the at least one processor core to perform a method for implementing physical designs using one or more force models, the method comprising:

at least one processor performing a process, the process comprising:

identifying a first set of cells representing a physical design area of an electronic design, wherein the at least one processor partitions the physical design area into the first set of cells, and the first set of cells are non-overlapping and need no overlap resolution;

determining one or more force models using at least the first set of cells at least one force model of the one or more force models is used to exert force on one or more nodes of a cell; and anchoring a first cell in the first set of cells by using a containment force model of the one or more force models to exert one or more forces on at least a part of the first cell.

34. The article of manufacture of claim 33, the process further comprising:

identifying incomplete conductivity information for the electronic design; and generating a placement layout or a floorplan by using one or more force models to iteratively morph the first set of cells.

35. The article of manufacture of claim 33, the process further comprising:

reconfiguring the conductivity for the first set of cells to have a substantially uniform degree.

36. The article of manufacture of claim 33, in which the act of determining the one or more force models comprises:

identifying one or more characteristics of elements of a graph that is constructed by using at least the first cells, wherein the act of identifying the one or more characteristics of the elements of the graph comprise determining whether the elements of the graph are constructed by using Voronoi cells.

37. The article of manufacture of claim 36, in which the act of determining the one or more force models comprises:

identifying a first node connected to a second node in the graph based at least in part upon conductivity information; and determining one or more attractive force models for the first node, in which the one or more attractive force models comprise at least one of a cell-based attractive force model and a cell attractive force model.

38. The article of manufacture of claim 36, in which the act of anchoring the first cell in the first set of cells by using the containment force model comprises:

determining the containment force model for a first node of the first cell;

identifying the first node of the first cell;

identifying boundary of a containment for the first node; and determining a repulsive force between the boundary and the first node, wherein the repulsive force is inversely proportional to a distance between the first node and the boundary.

39. A system for implementing physical designs using one or more force models, comprising:

a computing system that comprises at least one processor having at least one core and is to:

identify a first set of cells representing a physical design area of an electronic design, wherein the at least one processor partitions the physical design area into the first set of cells, and the first set of cells are non-overlapping and need no overlap resolution;

determine one or more force models using at least the first set of cells at least one force model of the one or more force models is used to exert force on one or more nodes of a cell; and anchor a first cell in the first set of cells by using a containment force model of the one or more force models to exert one or more forces on at least a part of the first cell.

40. The system of claim 39, wherein the computing system is further to:

identify incomplete conductivity information for the electronic design; and generate a placement layout or a floorplan by using one or more force models to iteratively morph the first set of cells.

41. The system of claim 39, wherein the computing system is further to:

reconfigure the conductivity for the first set of cells to have a substantially uniform degree.

42. The system of claim 39, in which the computing system that is to determine the one or more force models is further to:

identify one or more characteristics of elements of a graph that is constructed by using at least the first cells, wherein the act of identifying the one or more characteristics of the elements of the graph comprise determining whether the elements of the graph are constructed by using Voronoi cells.

43. The system of claim 42, in which the computing system that is to determine the one or more force models is further to:

identify a first node connected to a second node in the graph based at least in part upon conductivity information; and determine one or more attractive force models for the first node, in which the one or more attractive force models comprise at least one of a cell-based attractive force model and a cell attractive force model.

44. The system of claim 42, in which the computing system that is to anchor the first cell is further to:

determine the containment force model for a first node of the first cell;

identify the first node of the first cell;

identify boundary of a containment for the first node; and determine a repulsive force between the boundary and the first node, wherein the repulsive force is inversely proportional to a distance between the first node and the boundary.

\* \* \* \* \*